US008972495B1

(12) United States Patent
Borna

(10) Patent No.: US 8,972,495 B1
(45) Date of Patent: Mar. 3, 2015

(54) METHOD AND APPARATUS FOR COMMUNICATION AND COLLABORATIVE INFORMATION MANAGEMENT

(75) Inventor: Amir Borna, San Francisco, CA (US)

(73) Assignee: Tagatoo, Inc., San Francisco, CA (US)

( * ) Notice: Subject to any disclaimer, the term of this patent is extended or adjusted under 35 U.S.C. 154(b) by 0 days.

(21) Appl. No.: 11/521,636

(22) Filed: Sep. 14, 2006

Related U.S. Application Data

(60) Provisional application No. 60/717,158, filed on Sep. 14, 2005.

(51) Int. Cl.
*G06F 15/16* (2006.01)
*H04L 12/58* (2006.01)

(52) U.S. Cl.
CPC ............... *H04L 51/24* (2013.01); *H04L 12/58* (2013.01); *H04L 51/34* (2013.01)
USPC ............ 709/204; 709/206; 715/751; 715/752

(58) Field of Classification Search
CPC .......... H04L 51/24; H04L 51/34; H04L 12/58
USPC .......... 709/206, 240, 204; 715/501, 751, 752; 707/102
See application file for complete search history.

(56) References Cited

U.S. PATENT DOCUMENTS

| | | | |
|---|---|---|---|
| 7,007,235 B1 * | 2/2006 | Hussein et al. | 715/751 |
| 7,222,156 B2 * | 5/2007 | Gupta et al. | 709/206 |
| 7,275,063 B2 * | 9/2007 | Horn | 707/102 |
| 7,386,535 B1 * | 6/2008 | Kalucha et al. | 707/2 |
| 7,461,129 B2 * | 12/2008 | Shah et al. | 709/207 |
| 2002/0107931 A1 * | 8/2002 | Singh et al. | 709/206 |
| 2004/0034688 A1 * | 2/2004 | Dunn | 709/206 |
| 2004/0177319 A1 * | 9/2004 | Horn | 715/501.1 |
| 2005/0060643 A1 * | 3/2005 | Glass et al. | 715/501.1 |
| 2005/0165789 A1 * | 7/2005 | Minton et al. | 707/10 |
| 2006/0106942 A1 * | 5/2006 | Shan et al. | 709/240 |
| 2006/0168073 A1 * | 7/2006 | Kogan et al. | 709/206 |
| 2007/0050448 A1 * | 3/2007 | Gonen et al. | 709/204 |
| 2008/0021921 A1 * | 1/2008 | Horn | 707/102 |
| 2008/0256069 A1 * | 10/2008 | Eder | 707/5 |
| 2008/0300900 A1 * | 12/2008 | Demarest et al. | 705/1 |

OTHER PUBLICATIONS

Boyce, Jim. "Microsoft Office Outlook 2003 Inside Out." Publisher: Microsoft Press Pub. Date: Nov. 5, 2003.*
Bellotti, "Taking Email to Task", Pub. Date: 2003, http://dl.acm.org/citation.cfm?id=642672, pp. 1-8.*

* cited by examiner

*Primary Examiner* — Krista Zele
*Assistant Examiner* — James Forman
(74) *Attorney, Agent, or Firm* — Wilson Sonsini Goodrich & Rosati

(57) ABSTRACT

A communication system includes a communication server configured to receive a request to generate a communication and receive a request to associate the communication with one or more classifications from a plurality of classifications. The system further includes a store coupled to the communication server and configured to store the communications and/or store the classification received in the association request. The classifications are associated with a request for information from a recipient of the communication. The classifications are associated with a request for information from a recipient of the communication, a request for sharing information with the recipient of the communication, and a request for action from the recipient of the communication.

17 Claims, 18 Drawing Sheets

METHOD AND APPARATUS FOR COMMUNICATION AND COLLABORATIVE INFORMATION MANAGEMENT

CROSS REFERENCE TO RELATED APPLICATIONS

This non-provisional application claims priority to U.S. Provisional Patent Application No. 60/717,158, filed Sep. 14, 2005, titled "METHOD AND APPARATUS FOR COMMUNICATION AND COLLABORATIVE INFORMATION MANAGEMENT," of Amir Borna and which is incorporated by reference herein in its entirety for all purposes.

BACKGROUND OF THE INVENTION

The present invention generally relates to a collaborative information management, and more particularly relates to categorization of communications for task, inquiry, or information related e-mails.

Tradition e-mail systems typically provide a limited ability for system based classification of e-mails. For example, traditional e-mail systems are configured to permit a sender may be permitted to set a flag or the like to indicate the importance of an e-mail. An importance flag generally indicates that the e-mail content is important. However, the importance flag does not impose a system based urgency on the e-mail or on a response or action that is required based on the e-mail.

Traditional e-mails systems typically provide options for e-mail recipients to filter received e-mails based on content and/or metadata for the received e-mail. However, if a sender sets a filter overly broad, the sender's e-mail system might receive a relatively large number of e-mails that renders the filter relatively useless. Alternatively, if a sender sets a filter overly narrow, the sender's e-mail system might not receive an e-mail that has a relatively high importance or a relatively high urgency. For example, if an e-mail recipient attempts to block spam based on a personal filter, the recipient's e-mail system might block the spam (e.g., e-mails sent in bulk that a recipient would prefer not to receive) and block e-mail the recipient would like to receive, and/or let undesired spam enter the recipient's e-mail system.

Traditional e-mail system provides options to set tasks for e-mail recipient. However, these systems proved limited task assignment. For example, a task may be assigned to one recipient and may not be shared with others. Moreover, a number of tasks may not be set for multiple senders via a single task request.

Accordingly, new communication systems are needed that provide system based classification of communications in both synchronous and asynchronous communication systems to permit senders to set the system based classifications of communications, and to permit recipients via the recipient's communication system to organize, filter, and/or take action based on the system classifications of communications set by a sender and imposed by the communication system.

BRIEF SUMMARY OF THE INVENTION

The present invention provides a collaborative information management system. More particularly the present invention provides an e-mail system configured to categorize communications, such as e-mail, based on system classification, such as a task, an inquiry, or information related an e-mail.

A specific embodiment of the collaborative information management system includes a communication server configured to receive a request to generate a communication and receive a request to associate the communication with one or more classifications from a plurality of classifications; and a store coupled to the communications server and configured to store the communications and/or store the classification received in the association request. The classifications are associated with a request for information from a recipient of the communication, a request for sharing information with the recipient of the communication, and a request for action from the recipient of the communication.

According to a specific embodiment, the classification may further include user defined classifications. According to another specific embodiment, the classifications are system classifications that include a task, an inquiry, and an FYI. The communication is an e-mail, an instant message, a text message, or a voice message.

According to another specific embodiment, the communication server is configured to allow or disallow the delivery of the communication based on the one or more classifications. The allowance or disallowance is based on a user hierarchy, an organization preference, and/or a user preference.

According to another specific embodiment, the communication server is configured receive a request to delegate at least a portion of the request for information and/or at least a portion of the request for action, and based on the delegation request, the communication server is configured to generate and send another communication based on the delegation request. The communication server is configured to generate at least one report based on the classifications stored in the store, track the status of the request for information, or the request for action. The status may include a due date, start date, completion date, a delegation, dependencies between requests for action, or a priority for completion or response to the request for action or the request for information. The report includes the status of the request for action and at least one other request for action associated with the request for action. The association between the request for action and the other request for action is a delegation.

According to another specific embodiment, the communication server is configured to communicate the report to members of a group associated with the requests for action or the requests for information. The report is configured to provide the members of a group a collaborative overview of the requests for action or the requests for information. The communication server may be further configured to track and store the status of the request for information, or the request for action and generate and send communications to members of a group associated with the request for information, or the request for action wherein the communication includes the status.

According to another embodiment of the present invention, the collaborative information management system includes a communication server configured to receive a request to generate a communication and receive a request to associate the communication with one or more classifications from a plurality of classifications; and a store coupled to the communication server and configured to store the communications and/or store the classification received in the association request. The classifications are associated with a request for information from a recipient of the communication, a request for sharing information with the recipient of the communication, and a request for action from the recipient of the communication. The communication server is configured to provide a user interface for a client system, and the user interface includes information for the classifications organized in a task bar, a delegation chart, multi-pane list view, and/or a nudge.

According to another embodiment of the present invention, a communication system includes a client system configured to display a page that includes a screen option configured to launch an application that adds at least one function to the page, wherein the function is not associated with the inherent functionality of page. According to a specific embodiment, the function includes collaborative functions. The collaborative functions may include receiving a request to generate a communication and receive a request to associate the communication with one or more classifications from a plurality of classifications, and the communication includes information for the page. The information for the page may include information for content of the page. The application may be for a task bar or a nudge.

A better understanding of the nature and advantages of the present invention may be gained with reference to the following detailed description and the accompanying drawings.

DETAILED DESCRIPTION OF THE INVENTION

The present invention provides a collaborative information management system. More particularly the present invention provides an e-mail system configured to categorize communications, such as e-mail, based on system classification, such as a task, an inquiry, or information related an e-mail.

Most e-mail systems and messaging applications are folder based, which means a single object can exist only in one location. If the object has to be in another location, a copy has to be created. This is part of the reason why e-mail applications have to have N copies of a message if the message has been sent to N people.

Embodiment of the present invention use labels to present grouping. Similar to categories a single object can have several labels. The embodiment is configured to provide views based on Labels similar to Folders. The advantage is the same object can be displayed under many groups or labels.

Since one single object is used in the system, the system doesn't need to create copies and can share the same object under different groups or labels.

This allows the system to go even one step further and have a single copy of the communication in the entire system, even if it has been sent to multiple users. Such approach allows for the object to have several metadata attached to it, which can also be shared with other users.

System Overview

Figure 1:
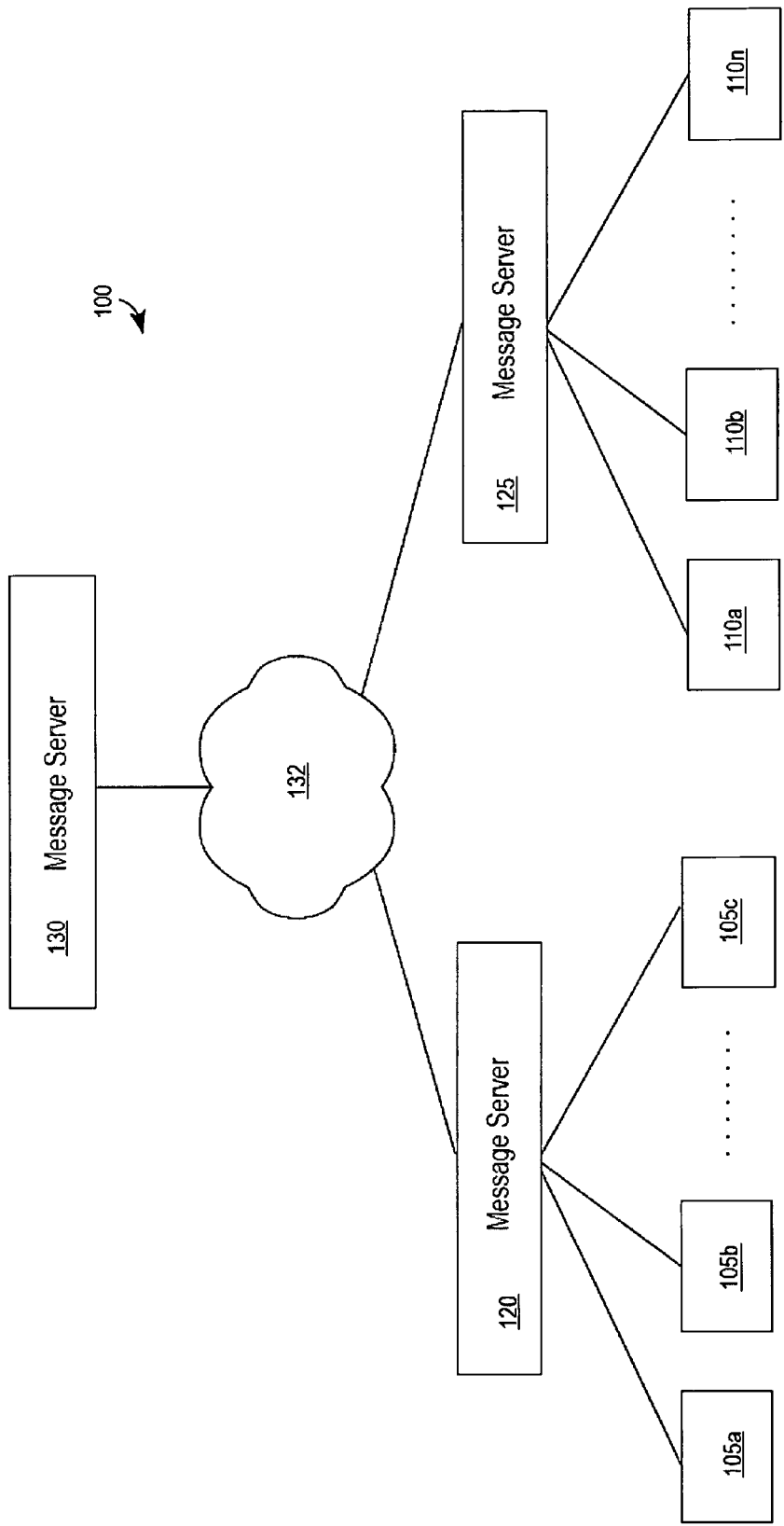
FIG. 1 is a simplified schematic of a communication system according to one embodiment of the present invention.

FIG. 1 is a simplified schematic of a communication system 100 according to one embodiment of the present invention. Communication system 100 includes at least one plurality of client systems 105. Communication system 100 may include more pluralities of client systems, such as a plurality of client system 110. The pluralities of clients systems 105 and 110 may be associated with a single organization, such as a corporation, or may be associated with disparate organizations, such as different corporations. Communication system 100 further includes at least one message server 120, and may include a number of message servers, such as message servers 125 and 130. The message servers and/or the client systems might be configured to communicate via a network 132. The network might be an intranet if, for example, client systems 105 and 110 or members of a single organization. Alternatively, the network might be the Internet. Each message server might be a Microsoft Exchange™ server, the Domino™ Server of IBM, the Novell server, a proprietary server or the like.

Each client system is configured to run a communication application, such as an e-mail application, an instant message application, a web based e-mail system configured for use via a browser window or the like. The e-mail application might be a proprietary application, Outlook™ Express™ of Microsoft, Outlook™ of Microsoft, ThunderBird™ of Mozilla Foundation or the like.

Figure 2:
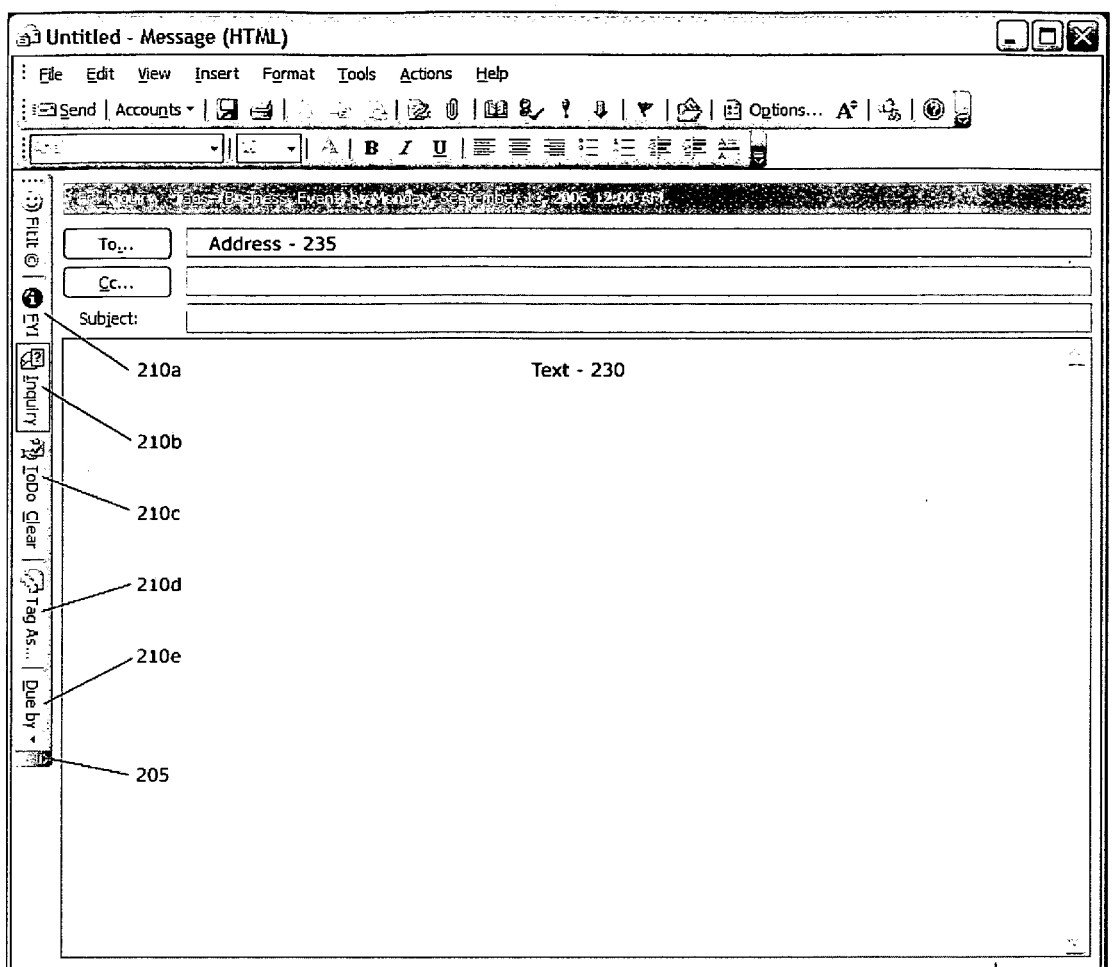
FIG. 2 is a simplified illustration of a user interface according to one embodiment of the present invention.

FIG. 2 is a simplified illustration of a sender user interface (UI) 200 according to one embodiment of the present invention. The e-mail application is configured to present UI 200 on the displays of one or more of the client systems. The UI includes a toolbar 205 or the like (e.g., a drop down menu, a set of control buttons, etc.) that is configured to accept a sender (e.g., a sender who requests the e-mail application to send a communication, such as an e-mail) a selection for classifying a communication, such as an e-mail. A set as referred to herein may include one or more elements. Toolbar 205 may include a set of screen buttons 210 that is configured to accept the sender selection. The set of screen button may include an FYI (i.e., for your information) button 210a, an inquiry button 210b, and a task button 210c.

The UI interface is also configured to receive text 230 (e.g., text for an e-mail) that is input from a sender via the client system. The UI is also configured to receive an address 235 for each recipient that is to receive the e-mail according to one embodiment of the present invention. The UI interface is configured to receive a selection via the screen buttons for classifying the e-mail. A sender may choose via the set of screen buttons to classify the e-mail with one or more of "system classifications," such as a task, an FYI, and an inquiry. The UI may include other system classifications in addition to those system classifications described herein. The e-mail system may be configured to permit an administrator of the e-mail system to define a user defined system classification for e-mails. For example, a sender might define a "bug" system classification wherein the bug system classification has a number of attributes. Those of skill in the art will be familiar with one or more methods that have steps permitting an administrator of the e-mail system to define user defined system classification. Attributes of system classifications are described in detail below.

An e-mail might be associated with a set of classification based. The classification might include system classifications, user defined system classification, and/or user defined classifications. The user defined classifications are sometimes referred herein as tags. UI 200 might include a screen button 210d that is configured to permit a sender to enter a user defined classification. An e-mail, for example, might be assigned a plurality of classifications where the classifications are associated with particular intended recipients of the e-mail. For example, each e-mail associated with a given recipient might be assigned zero or more tasks, zero or more FYIs, and/or zero or more inquiries. Further, the e-mail might be associated with one or more other recipient wherein the e-mail might be assigned zero or more tasks, zero or more FYIs, and/or zero or more inquires for the one or more other recipients. For example, the e-mail might be associated with a first task for a first recipient, a second task for a second recipient, and an inquiry for a third recipient. According to one embodiment the first task and the second task might be the same task. Alternatively, for example, the e-mail might be associated with an inquiry for a first recipient, a task for a second recipient, and an FYI for third and forth recipients.

System classifications might be assigned on a per recipient bases according to a variety of methods. For example, different lines of text within an e-mail might be associated with different recipients of the e-mail and the lines might be associated with one or more classification, such as system classification. For example, a line of text within an e-mail might be selected via a highlighting method or the like and the particular highlighted text might be assigned a given system classification for one or more recipients. Another piece of highlighted text might be assigned a different system classification for the same or additional recipients or different recipients. Drag and drop methods might also be used to assign system classifications. For example, a recipient's address might be dragged and dropped over a line of text to assign the recipient to the text and then a system classification might be dragged and dropped over the text to assign the system classification to the text. Alternatively, an e-mail in its entirety might be assigned a single system classification.

According to yet another embodiment, a system classification for an e-mail might be assigned based on the address assignment for the e-mail. For example, any recipient addressed in the CC line of the UI might receive the e-mail as an FYI, whereas a recipient addressed in the TO line of the UI might receive the e-mail as a task, an inquiry or an FYI.

Classification information for an e-mail might be included in the metadata for the e-mail. For example, the classification information might be stored and sent in the header for the e-mail. The classification information might also be added to the body of the e-mail. For example, a line of text might be added to the body of the e-mail to indicate that for a given recipient the e-mail is classified as a task, and for another recipient the e-mail is classified as an inquiry, an FYI, or alternatively is associated with a tag. Those of skill in the art will know of other methods for transferring the classification information for the e-mail. Alternate embodiments for presenting classification information for an e-mail are described in detail below.

Figure 3:
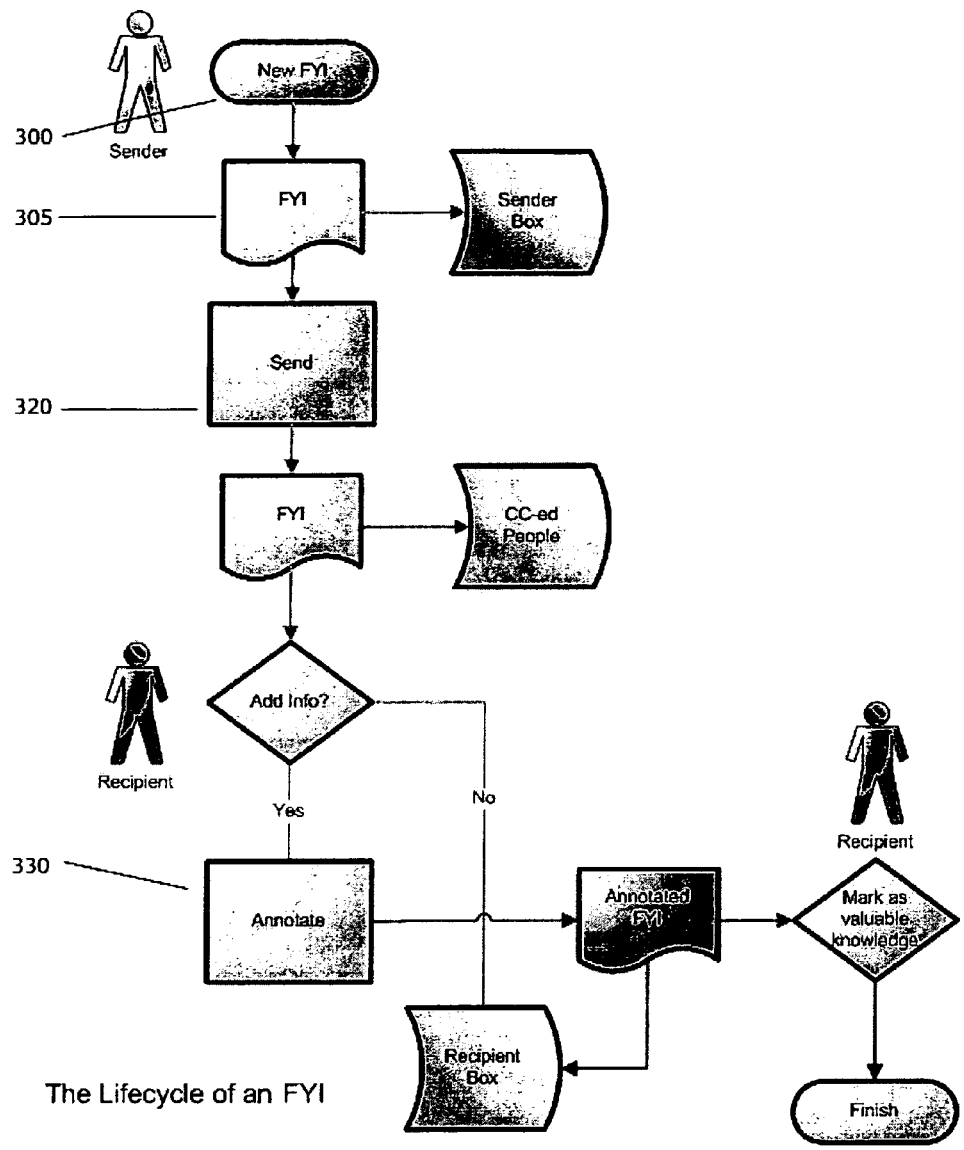
FIG. 3 is a high-level flow chart having steps for the life cycle of an FYI system classification according to one embodiment of the present invention.

FIG. 3 is a high-level flow chart having steps for the life cycle of an FYI system classification according to one embodiment of the present invention. The high-level flow chart is merely exemplary, and those of skill in the art will recognize various steps that might be added, deleted, and/or modified and are considered to be within the scope and purview of the present invention. The order of the steps of the high-level flow chart might also be arranged in other orders and these other orders are considered to be within the scope and purview of the present invention. Therefore, the exemplary embodiment should not be viewed as limiting the invention as defined by the claims. At 300, a sender, via the sender's client system, composes an e-mail. At 305, the sender via screen buttons 210 assigns the FYI system classification to the e-mail.

At an optional step, the sender might assign an additional user defined classification, such as a tag to the e-mail or a portion thereof (e.g., one line of text might be tagged). The user defined classification might be set by the sender via the "Tag as" screen button 210d in the set of screen button 210. According to one embodiment, the communication system, via one or more of the message servers, might be configured to suggest one or more tags to the sender. At another optional step, the sender might assign a time limit to the e-mail. The time limit might be a read time by which the recipient should read the e-mail.

At 320, the sender might press the send button to send the e-mail to the recipient. After the recipient's client system receives the e-mail, the recipient via the recipient's client system has the option to annotate the message in the e-mail. At another optional step in the method, the recipient via the recipient's client system changes the system classification for the e-mail. For example, the recipient might change the e-mail to a task for herself or another person. At another optional step, the recipient via the recipient's client system might assign additional user defined classifications, such as a tag to the e-mail or a portion thereof (e.g., one line of text might be tagged). The user defined classification might be set by the recipient via the "Tag as" screen button in the set of screen button 210. At another optional step 345, the recipient might assign a time limit to the e-mail. The time limit might be a read time, a time limited associated with a task completion, an inquiry completion or the like. The recipient might store the e-mail with the added metadata for the recipient's own use.

At another optional step, the recipient via the recipient's client system might address the e-mail to one or more other e-mail recipients and might add a system classification, a user defined system classification, a user defined classification or the like to the e-mail for the other e-mail recipients. The recipient might then send, via the recipient's client system, the e-mail to these other e-mail recipients.

Figure 4:
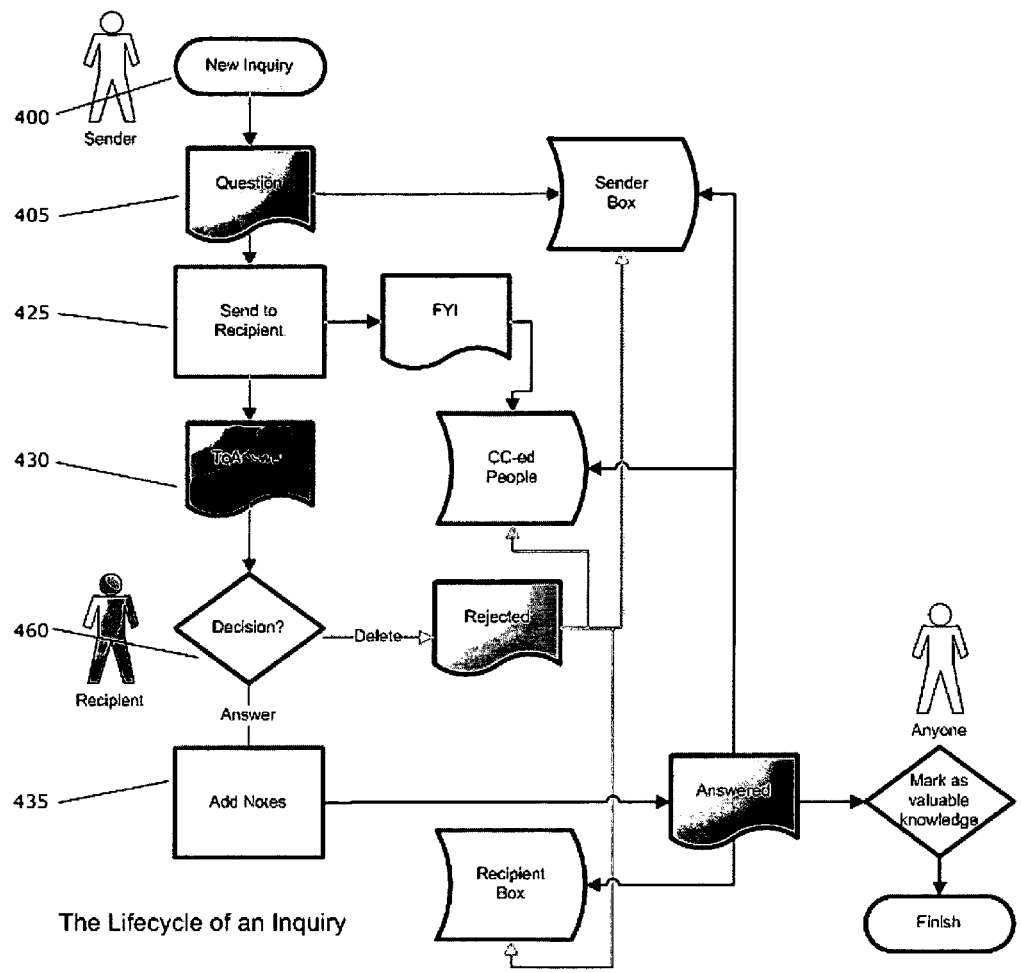
FIG. 4 is a high-level flow chart having steps for the life cycle of an inquiry system classification according to one embodiment of the present invention.

FIG. 4 is a high-level flow chart having steps for the life cycle of an inquiry system classification according to one embodiment of the present invention. The high-level flow chart is merely exemplary, and those of skill in the art will recognize various steps that might be added, deleted, and/or modified and are considered to be within the scope and purview of the present invention. The order of the steps of the high-level flow chart might also be arranged in other orders and these other orders are considered to be within the scope and purview of the present invention. Therefore, the exemplary embodiment should not be viewed as limiting the invention as defined by the claims. At 400, a sender, via the sender's client system, composes an e-mail. At 405, the sender via screen button 210b assigns the inquiry system classification to the e-mail.

At an optional step, the sender, via the sender's client system, might assign additional user defined classifications, such as a tag to the e-mail or a portion thereof (e.g., one line of text might be tagged). The user defined classification might be set by the sender via the "Tag as" screen button 210d in the set of screen button 210. At another optional step, the sender, via the sender's client system, might assign a time limit to the e-mail. The time limit might be a time by which the recipient of the e-mail should respond to the e-mail (i.e., respond to the inquiry).

At another optional step, the sender, via the sender's client system, might CC additional recipients of the e-mail where the e-mail is assigned an FYI system classification for these additional recipients.

At 425, the sender might press the send button to have the e-mail sent to the one or more recipients' client systems. At 430, the one or more recipients' client systems receive the e-mail. At 435, the recipient who receives the e-mail classified as an inquiry has the option to annotate the inquiry in the e-mail. At another optional step, the recipient via the recipient's client system changes the system classification for the e-mail. For example, the recipient might change the e-mail to a task for herself or another person. At another optional step, the recipient, via the recipient's client system, might assign additional user defined classifications, such as a tag to the e-mail or a portion thereof (e.g., one line of text might be tagged). The user defined classification might be set by the recipient via the "Tag as" screen button in the set of screen button 210. At another optional step, the recipient, via the recipient's client system, might assign a time limit to the e-mail. The time limit might be a read time, a time limited associated with a task completion, an inquiry completion or the like. The recipient, via the recipient's client system, might store the e-mail with the added meta for the recipient's own use.

At another optional step, the recipient, via the recipient's client system, might address the e-mail to one or more other e-mail recipients and might add a system classifications, a user defined system classification, a user defined classification or the like to the e-mail for the other e-mail recipients. The recipient, via the recipient's client system Might then send the e-mail to the client systems of these other e-mail recipients.

At 460 the recipient, via the recipient's client system, replies to the e-mail. The reply may be an answer to the inquiry. The sender might decide to delete the message, in which case the message server might be configured to send an e-mail to the sender to indicate that the inquiry has been deleted, i.e., rejected. The e-mail indicating rejection may be sent to the sender and/or to the other recipients of the original e-mail sent by the sender.

Figure 5:
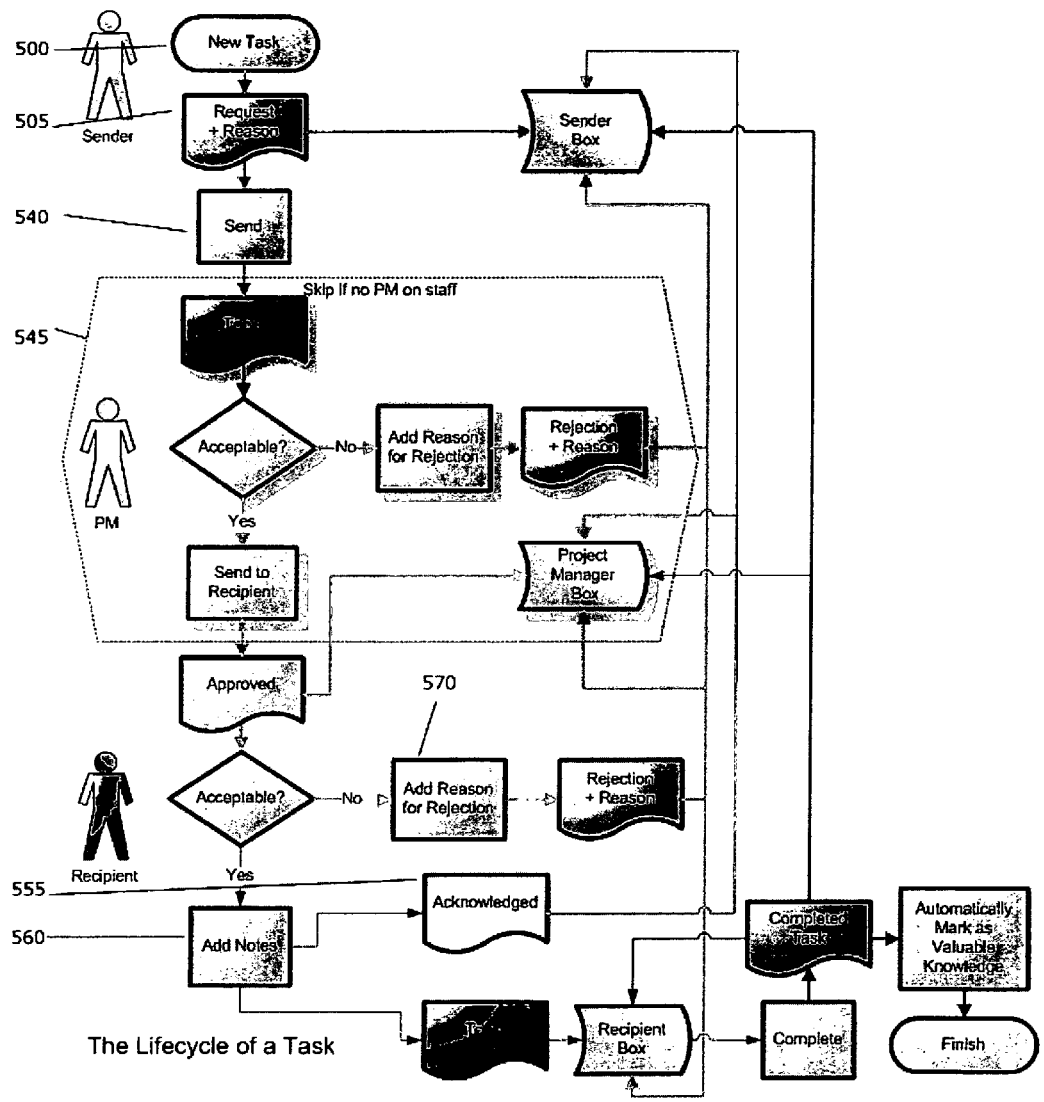
FIG. 5 is a high-level flow chart having steps for the life cycle of a task system classification according to one embodiment of the present invention.

FIG. 5 is a high-level flow chart having steps for the life cycle of a task system classification according to one embodiment of the present invention. The high-level flow chart is merely exemplary, and those of skill in the art will recognize various steps that might be added, deleted, and/or modified and are considered to be within the scope and purview of the present invention. The order of the steps of the high-level flow chart might also be arranged in other orders and these other orders are considered to be within the scope and purview of the present invention. Therefore, the exemplary embodiment should not be viewed as limiting the invention as defined by the claims. At 500, a sender, via the sender's client system, composes an e-mail. At 505, the sender via screen buttons 210c assigns the task system classification to the e-mail.

At an optional step, the sender, via the sender's client system, might assign additional user defined classifications, such as a tag to the e-mail or a portion thereof (e.g., one line of text might be tagged). The user defined classification might be set by the sender via the "Tag as" screen button in the set of screen button 210. At another optional step, the sender, via the sender's client system, might assign a time limit to the e-mail. The time limit might be a time by which the recipient should complete the task and respond to the task e-mail. At another optional step, the sender, via the sender's client system, might assign a start date to the task e-mail for a date on which the task should be started.

At another optional step, the sender, via the sender client system, might assign a task attribute. A task attribute might be an attribute of a system classification. The task attribute might be a project title that includes a description of the task, and/or a reason for executing the task. At another optional step, the sender, via the sender's client system, may assign a status attribute to the task e-mail. The status attribute might be an indication of the status of the task, such as not started, in progress, completed, percentage completed, and/or status of a related task to which the current task is dependent.

At another optional step, the sender, via the sender's client system, might CC additional recipients of the e-mail where the e-mail is assigned an FYI system classification for these additional recipients.

At 540, the sender might press the send button to have the e-mail sent to the one or more recipients' client systems. The sender might request, via the sender's client system, that the task e-mail be assigned to themselves.

According to another optional step, the task e-mails is sent to a project manager's client system prior to or in parallel with the delivery of the task e-mail to the recipients' client systems. At another optional step, the project manager, via the project manager's client system, can approve, reject, or defer the task e-mail. The project manager, via the project manager's client system, may annotate the task e-mail to indicate a reason for approval, rejection, or deferral the task. If the project manager rejects the task, a rejection e-mail is sent to each of the e-mail recipients (i.e., the recipients' client system) of the original e-mail. If project manager approves the task, an acceptance e-mail is sent to each of the recipients (i.e., the recipients' client system) of the original e-mail, and the recipient who the task is intended for will receive the task email as an approved task on which the recipient may begin preparing a response to the task. The project manager might request (i.e., the project manager's client system) the generation of an association between the received task in the task e-mail and another task. If the project manager defers the task, an e-mail is sent to each of the e-mail recipients of the original e-mail At an optional step 555, the recipient to whom the task is assigned generates, via the recipient's client system, a response to the task e-mail to indicate that the recipient accepts the task. The response might be an e-mail message, an instant message, a text message, an internal system communication or the like. At an optional step 560, the recipient, via the recipient's client system, may agree to all of task terms in the task, and send an e-mail to the sender and/or the other recipients indicating acceptance of all term in the task. At another optional step, the recipient, via the recipient's client system, may change a time for completing the task and indicate the newly proposed time of completion in the response e-mail. The recipient might request the generation of an association between the received task in the task e-mail and another task. At an option step 570, the he recipient might also reject, via the recipient's client system, the task request in the task e-mail. The recipient, via the recipient's client system, might annotate the task e-mail, or tag the task e-mail. A response might be sent out from a recipient's client system that indicates the rejection, wherein the response may be an e-mail message, an instant message, a text message, an internal system communication or the like this.

At another optional step, the recipient of the task may request the generation of another task e-mail in which all, a portion, or one or more portions of the task are re-assigned to one or more other recipients via the task e-mail. The foregoing described steps for assigning a task are substantially the same as the steps for re-assigning the task or re-assigning a portion of the task.

Figure 6:
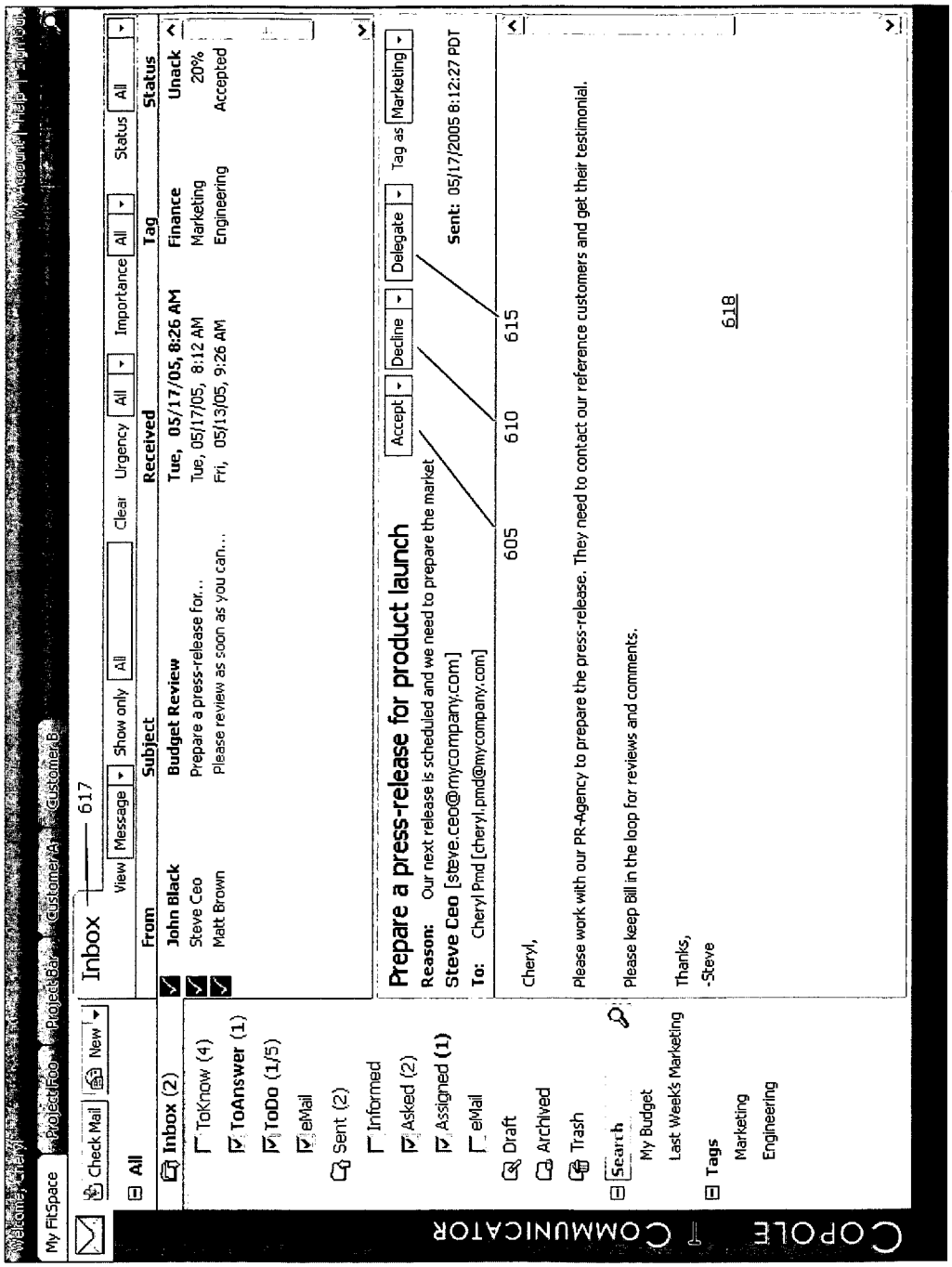
FIG. 6 is a simplified schematic of a user interface for a recipient's client system according to one embodiment of the present invention

FIG. 6 is a simplified schematic of a user interface (UI) 600 of the recipient according to one embodiment of the present invention. UI 600 might be a UI for a web based application or a proprietary based application of an embodiment of the present invention. The UI includes an acceptance button 605, a decline/rejection button 610, and/or a delegate button 615. While the interface is described as including screen buttons the controls by which the recipient performs the foregoing tasks might be controlled via a drop down menu, a set of radio buttons or the like. UI 600 might include an inbox 617 of an e-mail system and may include the task e-mail 618 and other information. It will be understood by those of skill in the art the while FIG. 6 shows a UI that is web based or proprietary based e-mail system, the UI might be for a text messaging system, an instant messaging system, or other e-mail system such as Outlook™ or the like.

Figure 7:
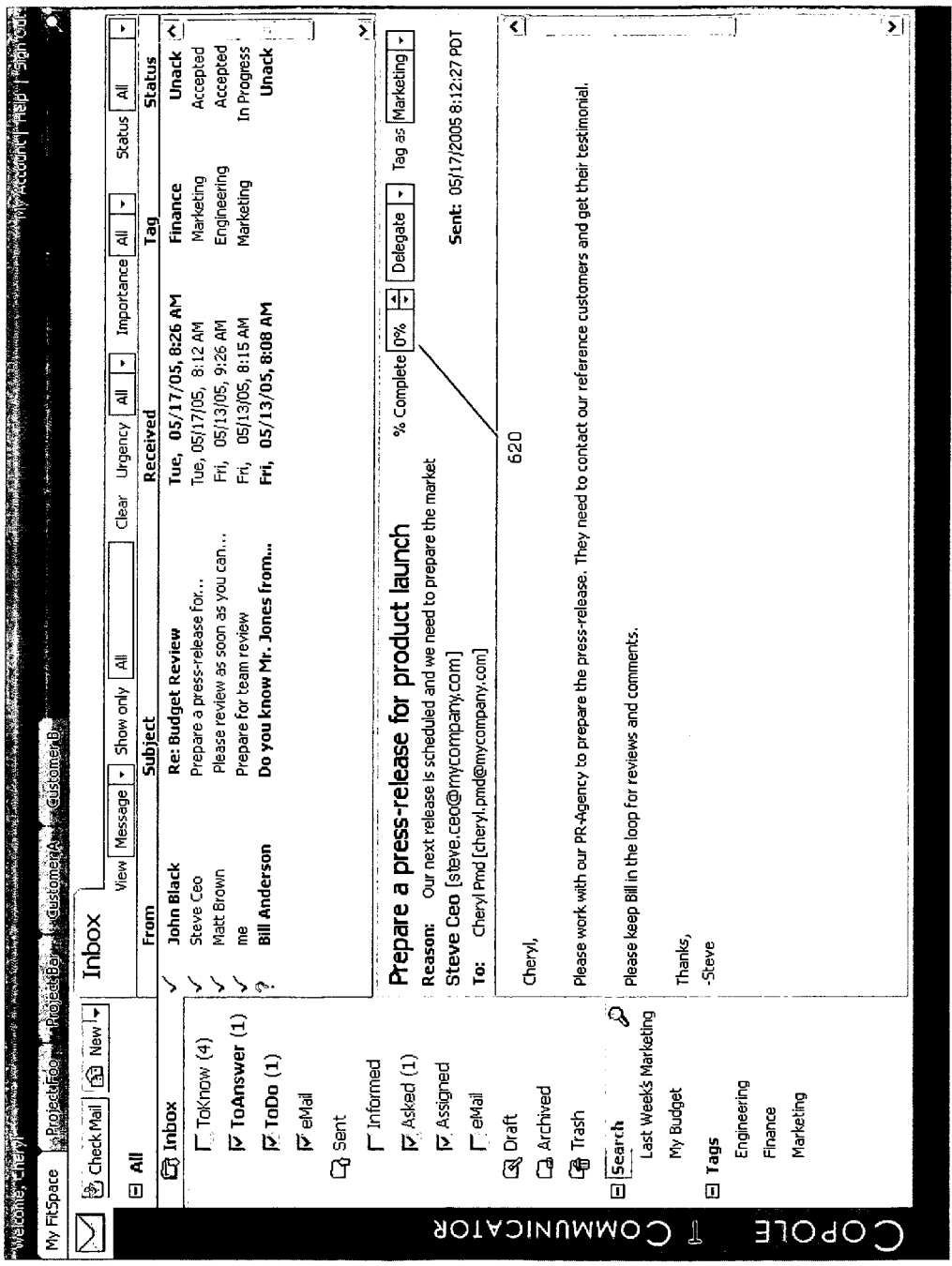
FIG. 7 is a simplified schematic of the user interface shown in FIG. 6 and includes a percent complete field 620.

FIG. 7 is a simplified schematic of a user interface (UI) 600 which may include a percent complete field 620. The user interface may be configured to accept a user input in percent complete field 620 to indicate a percentage completion of the task. After the recipient enters the percent complete for the task a communication is sent by the communication system to each original recipient of the originally sent task e-mail. The communication might be an e-mail, an IM, a text message or the like. Recipients (i.e., the recipients' client systems) of the delegated tasks might also enter, via the recipients' client systems, a percent completion in the percent completion field for these recipients' percent completion of their delegated tasks. A communication might similarly be sent by the communication system to each original recipient of the originally sent task e-mail where the communication indicates a percent completion of the delegated task.

Figure 8:
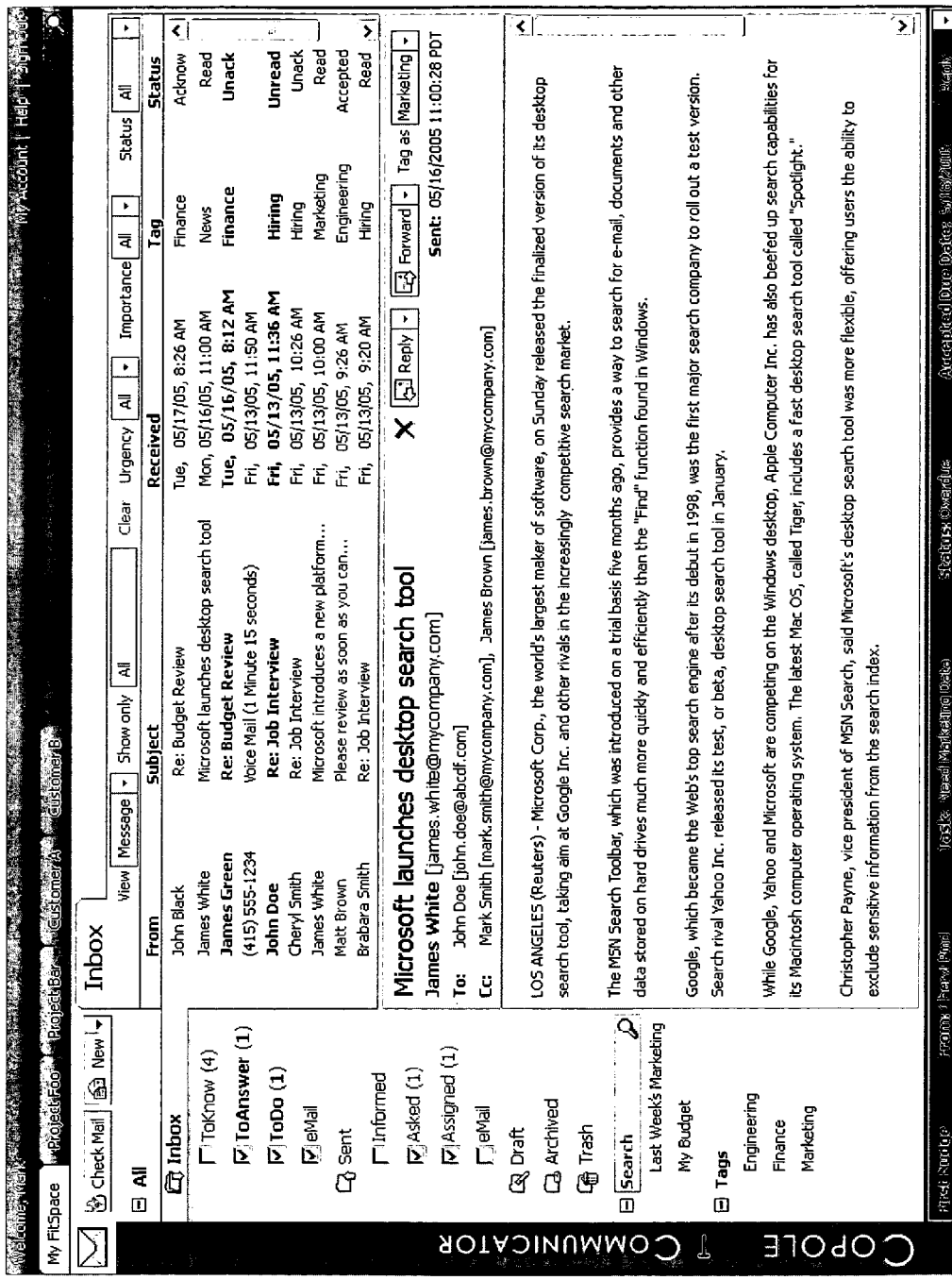
FIG. 8 is a simplified schematic of the user interface shown in FIG. 6 and includes a nudge tool that is displayed on a bottom portion of the user interface according to one embodiment of the present invention.

According to one embodiment of the present invention, one or more of the message servers is configured to permit the sender of a task or an inquiry to send a communication for a status request of the task or the inquiry. The status request is configured to be displayed prominently on the UI of the recipient's client system. FIG. 8 is a simplified schematic of UI 600 in which a nudge 625 is displayed at a bottom portion of the UI according to one embodiment of the present invention. Nudge 625 might be displayed in a color (e.g., bright pink, yellow, etc.) or a pattern that is relatively prominent. The recipient might respond to the nudge via another communication, e.g., an e-mail. If the recipient does not respond to the nudge, the message server may be configured to permit the sender to send a second nudge to the recipient. The message server may be configured to lock the e-mail system or the like of the recipient until the recipient, via the recipient client system, replies to the second nudge. The nudge message at the bottom of the UI will be removed by the message server after the nudge has been responded to.

According to one embodiment, if a recipient receives a given e-mail having a system classification that is an FYI, the recipient may be permitted by the message server to block further communications (e.g., e-mails) associated with the given e-mail. For example, the user interface may include a screen button or the like that permits the recipient to request not to be sent further communications in a thread of e-mails associated with the given e-mail. An e-mail in a thread of e-mails includes any e-mail sent that is responsive to and/or associated with the given e-mail.

According to one embodiment of the present invention, the message server is configured to limit the set of senders that may send e-mails with system classifications. The limit for sending e-mails with system classifications may be organization based, user based, contact list based, hierarchy based and/or a combination of the foregoing. According to organization based limiting, anyone in an organization (e.g., a corporation) may be permitted by the message server to send e-mails with system classifications to any other person in the organization. Members of an organization might be tracked based on an organization directory (e.g., phone book or the like). According to user based limiting, a first user may be required to agree with another user before the first user is permitted by the message server to send e-mails with system classifications to the other user. According to contact based limiting, a first user may be required to have an entry in another users contact list (e.g., phone book, etc.) before the first user is permitted by the message server to send e-mails with system classification to the other user. According to hierarchy based limiting, a first user having a higher status than another user may be permitted to send e-mails with systems classifications to the other user. A first user might have a higher status than another user if the first user is a direct or higher lever supervisor of the other user. A first user might alternatively have a higher status than another user if the first user has a higher rank, for example, in an organization.

According to one embodiment, if a sender, via the sender's client system, sends an e-mail with a system classification to a recipient (via the recipient's client system) to whom the sender is not permitted to send such an e-mail, the message server may be configured to send a communication to the sender, wherein the communication indicates this lack of permission. The communication sent to the sender may include instructions that the sender may follow to get permission to send e-mail with system classifications to the receiver.

According to one embodiment, the message server is configured to permit a sender to set an expiration date for an e-mail. An expiration date is a date by which the e-mail is irrelevant. Based on the expiration date, the message server may be configured to delete the e-mail from the receiver's inbox, may be configured to move the e-mail out of the receiver's inbox to another folder, and/or might change the appearance of the e-mail in the receiver's inbox. For example, expired e-mail might be displayed in a grey text to indicate expiration, or a visible flag or text might be set to indicate the expiration of the e-mail. A line might be drawn through the text in the inbox that indicates the e-mail's expiration. Those of skill in art will know of a variety of methods for indicate expiration and/or for handling expired e-mails. These varieties of methods are considered to be within the scope and purview of the instant described embodiment of the invention.

Figure 9:
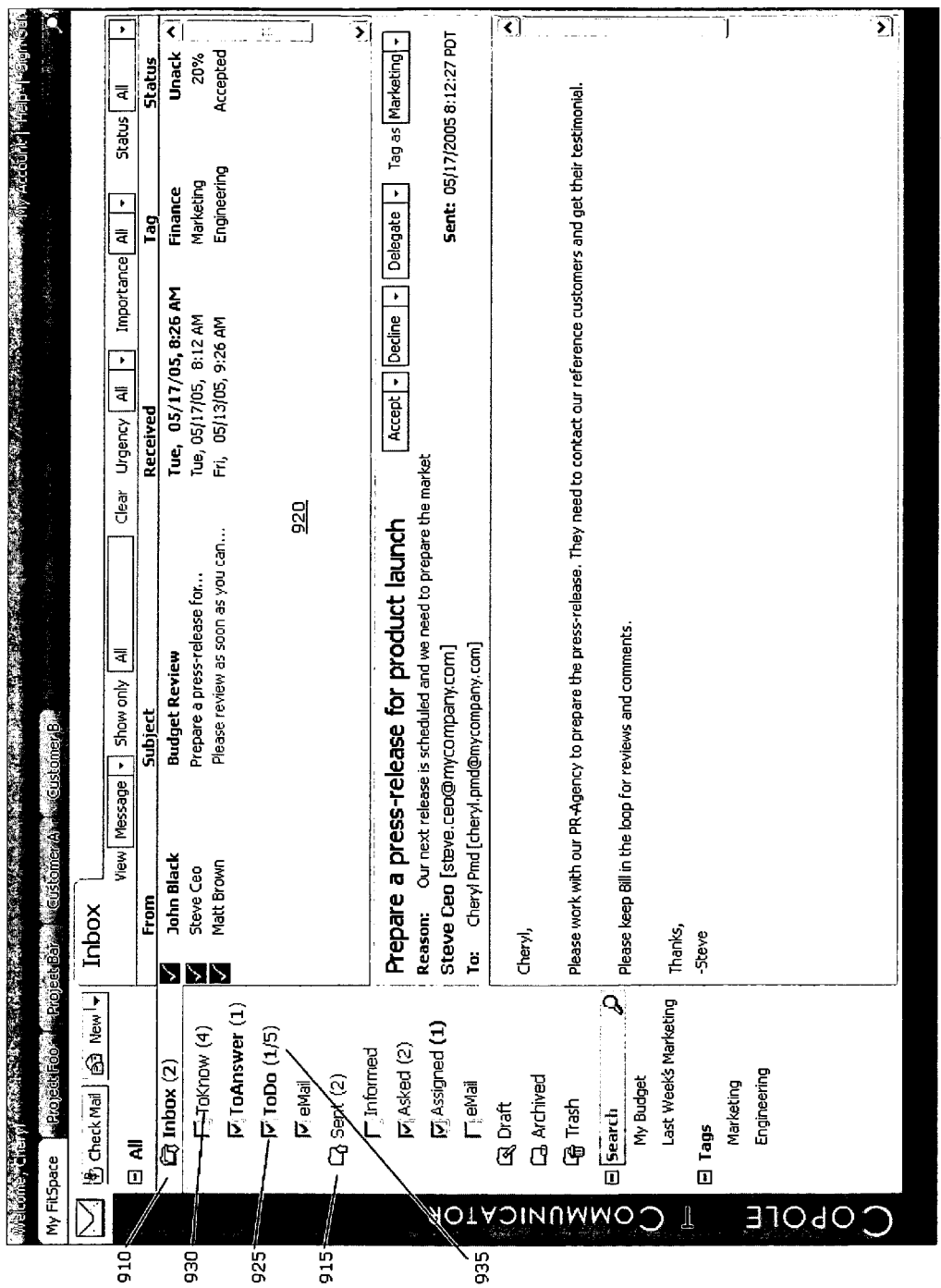
FIG. 9 is a simplified schematic of a user interface for the communication system according to one embodiment of the present invention.

FIG. 9 is a simplified schematic of a UI 900 according to one embodiment of the present invention. UI 900 may be the UI of an e-mail program that a user might use to send, and/or access e-mails having system classifications or the like. The UI includes an inbox folder 910 and a sent items folder 915, and includes a pane 920 that is configured to display the contents of a selected folder. Within the inbox folder and the sent items folder e-mail may be organized based on system classifications. Each system classification might be associated with a check box 925 or the like that is configured to filter the e-mails that are in a given folder, such as the inbox folder or the sent folder. The e-mails having one or more system classification may be displayed in pane 920 if the checkboxes for the one or more system classifications are checked.

The text 930 associated with a check box might also be configured to be selected by a user for example, by "clicking" on the text. Via the selection of text (e.g., the "ToKnow" text) the e-mails associated only with that selected text (i.e., selected system classification) is displayed in pane 920. For example, a user might click on the "ToKnow" text and all e-mail associated with the ToKnow folder is displayed in pane 920. A ToKnow e-mail is a received e-mail having an FYI system classification. An "Informed" e-mail is a sent e-mail having an FYI system classification. A "ToAnswer" e-mail is a received e-mail having an inquiry system classification. An "Asked" e-mail is a sent e-mail having an inquiry system classification. A "ToDo" e-mail is a received e-mail having a task system classification. An "Assigned" e-mail is a sent e-mail having a task system classification.

According to one embodiment of the present invention, the message server is configured to track e-mails having system classifications associate therewith. More specifically, for each sender and each recipient of an e-mail having one or more system classifications, the message server is configured to tally the number of e-mails associated with each system classification. Further, the message server is configured to track and tally the number of e-mails having system classifications for which a response has or has not been sent. A response may include the acceptance, rejection, modification, etc. (discussed in detail above) of a task e-mail, an inquiry e-mail, an FYI e-mail or user defined system classification e-mail. UI 900 shown in FIG. 9 includes tally indicators 935 that indicate the number e-mails associated with the system classification task (e.g., ToDo, Assigned), inquiry (Asked, ToAnswer), and FYI (e.g., Informed, ToKnow).

According to a specific embodiment, the tally indicator for the ToKnow folder indicates the number of e-mails that were received that have an FYI system classification. The tally indicator for the ToAnswer folder may include a first number, which may be bolded or the like, that indicates the number of unread and unanswered e-mails having an inquiry system classification. The second number may indicate the total number of unanswered e-mails having an inquiry system classification. The tally indicator for the ToDo folder may include a first number, which may be bolded or the like, that indicates the number of unread and unacknowledged e-mail having a task system classification. The second number may indicate the total number of unacknowledged e-mails having a task system classification.

According to a specific embodiment, the tally indicator for the Asked folder may indicate the number of unread and unanswered e-mails having an inquiry system classification. The tally indicator for the Assigned folder may indicate the number of unacknowledged e-mails having a task system classification that the sender has sent. According to one embodiment, a tally indicator might be displayed in a prominent manner if a time limit (discussed above in detail) for response to a given e-mail has expired. The prominent display may include bolding a number, displaying the number in a color that is different from other numbers, and/or adding a number to indicate expiration.

According to another embodiment of the present invention, the message server is configured to track the number of delegated tasks that have been delegated to others by an original recipient of a task e-mail. Further, the message server is configured to display on UI 900 or the like the number of delegations per task that the recipient has assigned for the task. The number of delegations might be displayed in pane 920 and might be displayed adjacent to a task title, an indicator for the task sender, or the like for the task e-mail.

Figure 10:
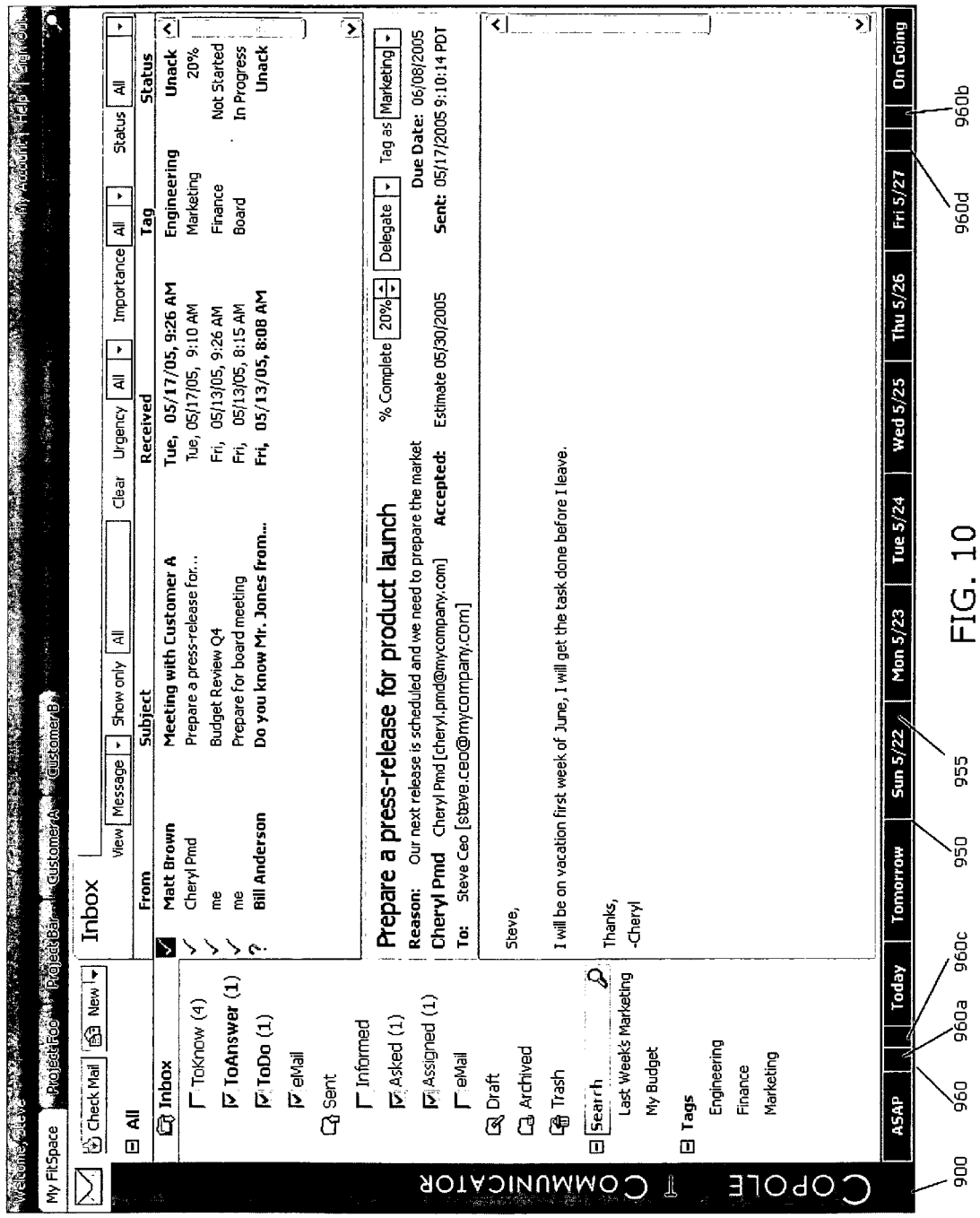
FIG. 10 is a simplified schematic of the user interface shown in FIG. 9 and includes a task bar according to another embodiment of the present invention.

FIG. 10 is a simplified schematic of UI 900 showing a task bar 950. The task bar includes a plurality of small panes 955 that indicate the days of a week. The small panes might be variously colored based on whether a task has a due date associated with that day, and based on whether the task is assigned to i) the particular user using the message server, ii) assigned to others by the user, or iii) assigned to the user by other users of the message server. For example, i) a task assigned by the user to herself, might be colored black, ii) a task assigned to other users by the user might be colored green, and iii) a task assigned to the user by other users might be colored blue. If a number of tasks have due dates on a given day, the small pane associated with the given day might be multi-colored (e.g., blue and green, or blue and black, etc.) to indicate tasks associated with the various users. According to one embodiment, if a task for any given user is overdue, then the small pane associated with the task might be displayed in another color, such as red. Each small panes may be configured to provide further details of the tasks associated with the small panes, if a cursor moved over (e.g., hovered over) the small panes.

If a task is not assigned a due date, then the ASAP small pane may be associated with that task. If a task has a repeating or recurring due date, then the On Going small pane may be associated with that task. The task bar might include a set of scroll buttons 960. A first scroll button 960a might be configured to scroll the dates of the task bar back to a first week that includes a day on which a task is due. A second scroll button 960b might be configured to scroll the dates of the task bar forward to a first week that includes a day on which a task is due. A third scroll button 960c might be configured to scroll the days in the task bar back by a given number of days (e.g., one day, seven days, etc.). A fourth scroll button 960d might be configured to scroll the days in the task bar forward by a given number of days (e.g., one day, seven days, etc.).

According to one embodiment of the present invention, one or more of the message servers is configured to collect and track metadata associated with e-mail, and specifically collect and track metadata associated with e-mail having system classifications assigned thereto. The metadata collected may include system classifications, user defined system classifications, user defined classification and data (e.g., annotations) associated with these classifications. The data collected that is associated with the classification may include any attribute associated with the classifications, such as identification information for people sending and/or receiving an e-mail, due dates, completion dates, dependencies between tasks, inquires, and FYI, dependencies between people, etc.

Figure 11:
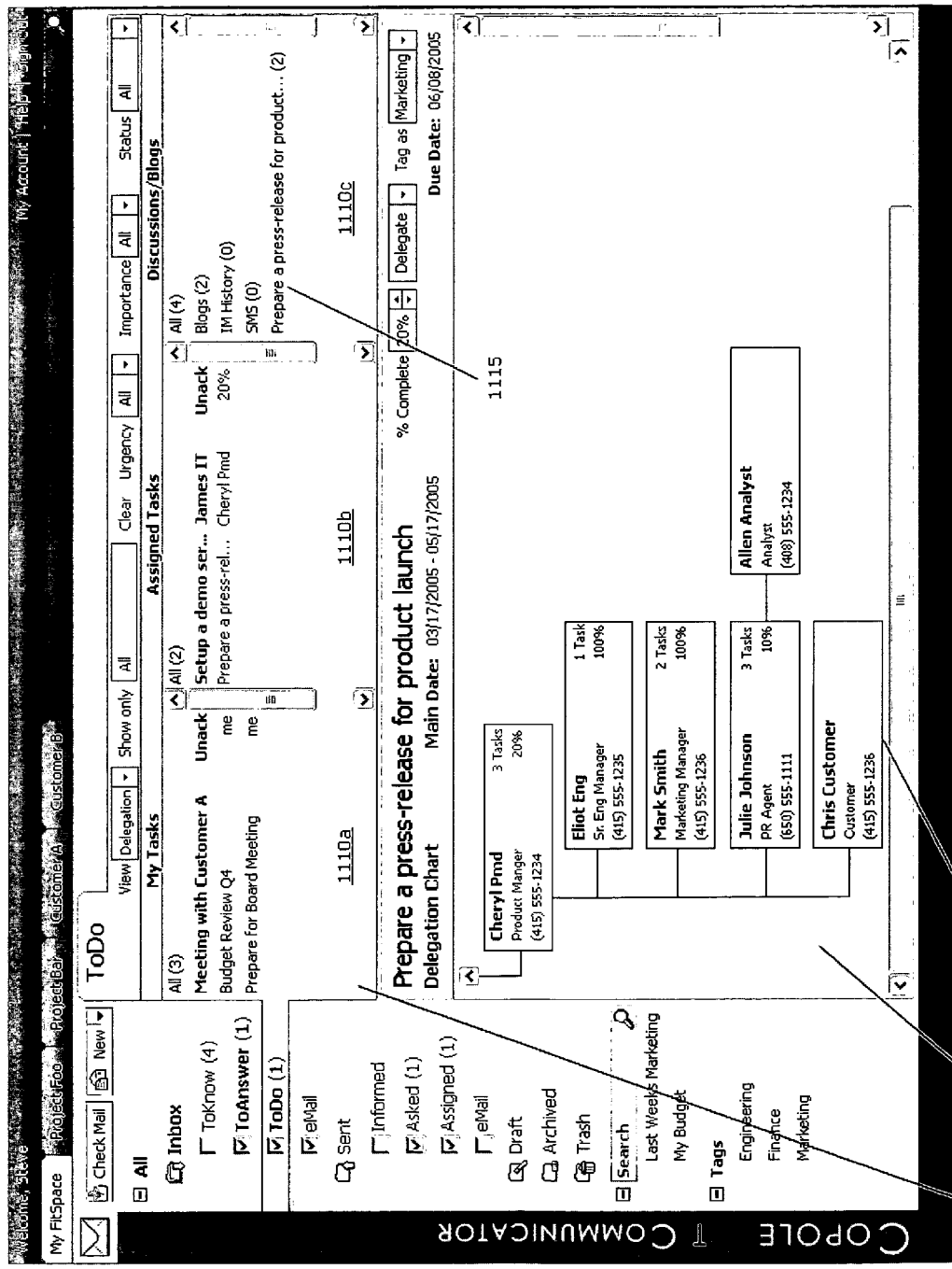
FIG. 11 is a simplified schematic of a delegation chart that might be generated by a message server based on colleted metadata for a communication.

One or more of the message servers may be configured generate one or more reports based on the collected metadata and/or make one or more decisions based on the metadata. FIG. 11 is a simplified schematic of a delegation chart 1100 that might be generated by a message server based on the colleted metadata. The delegation chart includes a hierarchy of tasks and subtasks, which are associated with the tasks. The hierarchy might be presented in the delegation charts as a set of boxes 1105 that may have information for the task or subtask, and one more boxes might have control functions associated therewith. The information might include a task name, an identifier of a person to whom the task is assigned, contact information for the person, task status (e.g., percentage complete, done, etc.), etc. The control functions associated with the boxes might be launched by a set of controls (e.g., control buttons, field windows, drop down menus, etc.). The control functions might be associated with a number of actions for a task, such as indicating whether the task is complete, changing a system dependency, changing a system classification or the like.

FIG. 11 also shows a multi-pane list view 1110 that includes information for tasks that might be generated based on the collected metadata. List 1110*a* includes information for all tasks assigned to a given user. List 1110*b* includes information for all tasks that the given user has assigned to other users of the message server. List 1110*c* includes all conversations 1115 between the given user and the other users. Conversations might include e-mail exchanges, IM exchanges, text messages, published blogs or the like, or any other type of synchronous or asynchronous messages in use at the time. According to one embodiment, the selection of a task (e.g., a task that has been clicked) in list 1110*a* is configured to present information in list 1110*b* where the information is associated with the selected task. The selection of a task (e.g., a task that has been clicked) in list 1110*b* is configured to present information in list 1110*c* where the information is associated with the selected task in list 1110*b*. The selection of a conversation (e.g., a conversation that has been clicked) in list 1110*c* may be configured to initiate the update of the displayed delegation chart 1100, a Gantt chart (described below), a report (described below) or the like.

Figure 12:
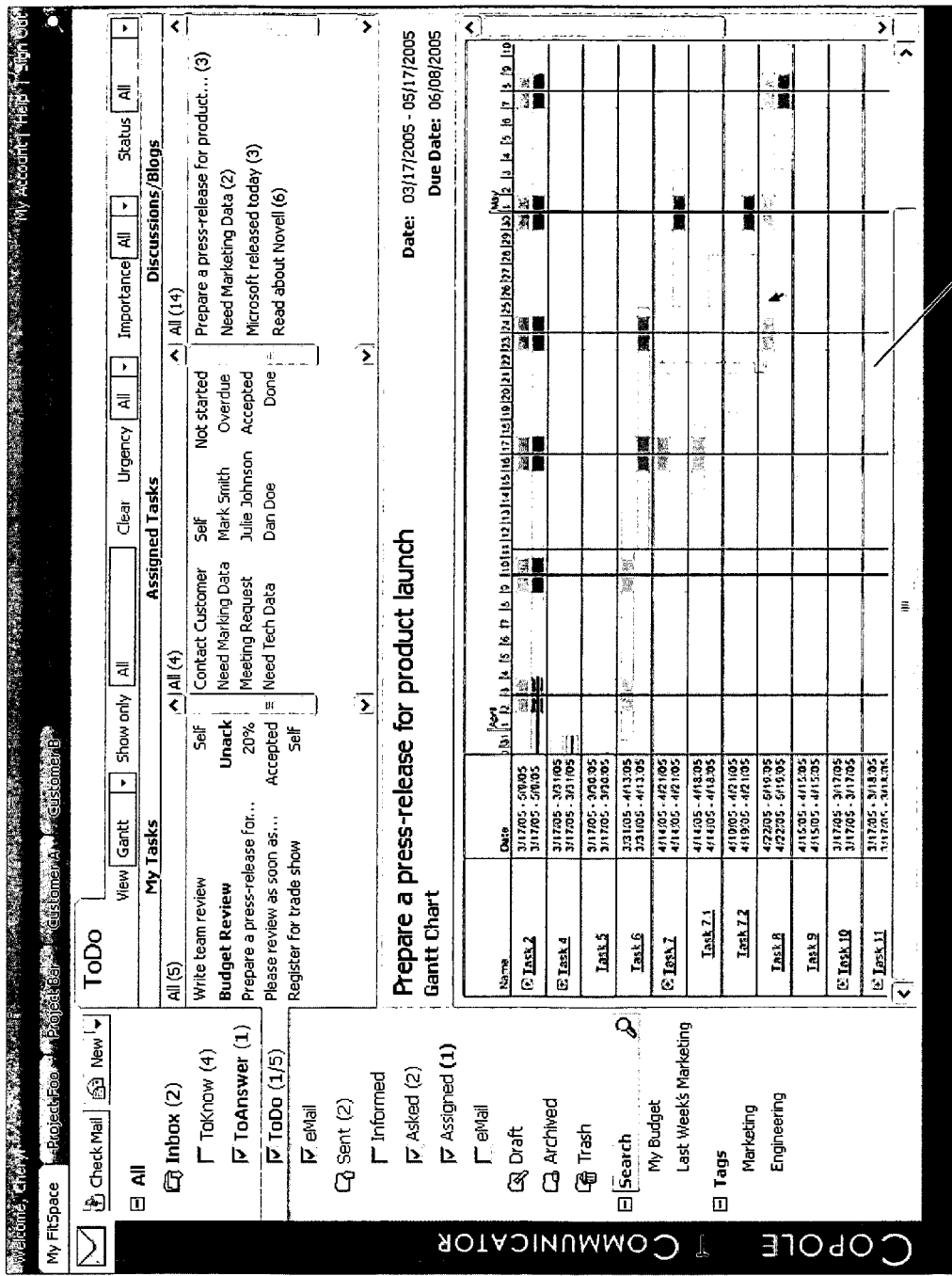
FIG. 12 is a simplified schematic of a Gantt chart that might be generated by a message server based on colleted metadata for a communication according to another embodiment of the present invention.

FIG. 12 is a simplified schematic of a Gantt chart 1200 according to another embodiment of the present invention. The Gantt chart might be generated based on the metadata collected by one or more of the message servers. The Gantt chart might include a display of the temporal organization of the tasks and a display of the dependencies of the tasks. Various other reports might be generated by the message server, such as weekly reports, monthly reports or the like for activity performed for a given task.

Figure 13:
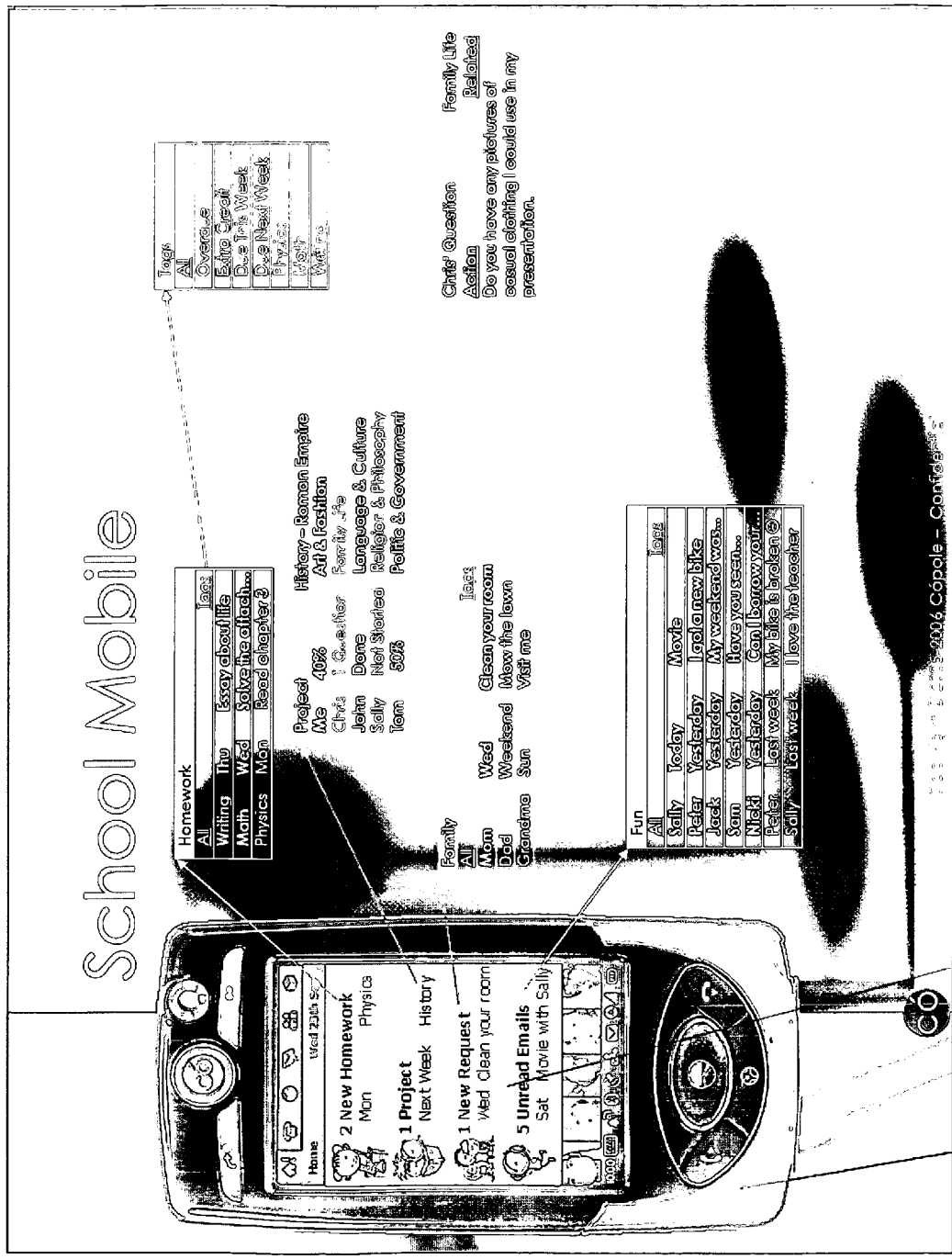
FIG. 13 is a simplified schematic of a PDA having a user interface that includes information for communications having a variety of system classifications.

As described briefly above, the message server is configured to provide system classifications for communications for a portable device, according to one embodiment of the present invention. The portable device might be a personal digital assistant (PDA), a mobile telephone, a smart phone, a portable e-mail device or the like. According to a specific embodiment of the present invention, the massage server is configured to associate system classifications with communications that might be communicated to and from a portable device that is configured for use by students. FIG. 13 is a simplified schematic of a PDA 1300 having a UI 1305 that includes information for communications having a variety of system classifications. According to one embodiment, the system classifications include "new homework," "project," and "new report." It should be understood that the forgoing described system classifications are exemplary. Those of skill in the art will know of other system classification that might be a user for a PDA for a student application. The described systems classifications may be associated with these communications at the request of a sender using an e-mail program (discussed above in detail), a web based application (e.g., a web based e-mail program) or the like. These programs/applications may be configured to receive a character string (text) (e.g., a homework assignment) for a communication (e.g., an e-mail for the homework assignment) and to receive one or more system classifications (e.g., a homework system classification) for the character string. These programs/applications might alternatively be instant message application, text message applications or the like. A user who requests that a communication with a system classification be sent to PDA 1300, may include a parent, a teacher, a school administrator, a friend or the like. The PDA may be configured to categorize and handle received communications similarly to an e-mail program receiving an e-mail that is assigned one or more of a task, an inquiry, and an FYI, for example. For example, the PDA may be configured to place the e-mails in three separate folders and to display the folders on the screen of the PDA. According to a further example, on the completion of a homework assignment, a project, or a request, the user might indicate (e.g., checking a check box) that the homework assignment, the project, or the request has been completed. The PDA may be configured to send a communication to the sender of the original communication for the homework assignment communication, the project communication, or the request communication to indicate that the homework, project, or request has been completed. According to one embodiment, if a completed piece of homework, a completed project, or a completed request is on the PDA, the homework, the project, the answer to the request might be sent with the communication that indicates the completion of the homework, the project, or the request.

According to one embodiment, if all homework assignments, projects, and requests have not been completed, the PDA may be configure to prevent the user of the PDA from accessing personal communications 1310, games, and the like on the PDA. If all homework assignments, projects, and requests have been completed, the PDA may be configure to permit the user of the PDA to access the personal communications, games, and the like on the PDA. Alternatively, the PDA may be configured to prevent and/or inhibit a user of the PDA to access personal communications 1310, games and the like during school hours.

Figure 14:
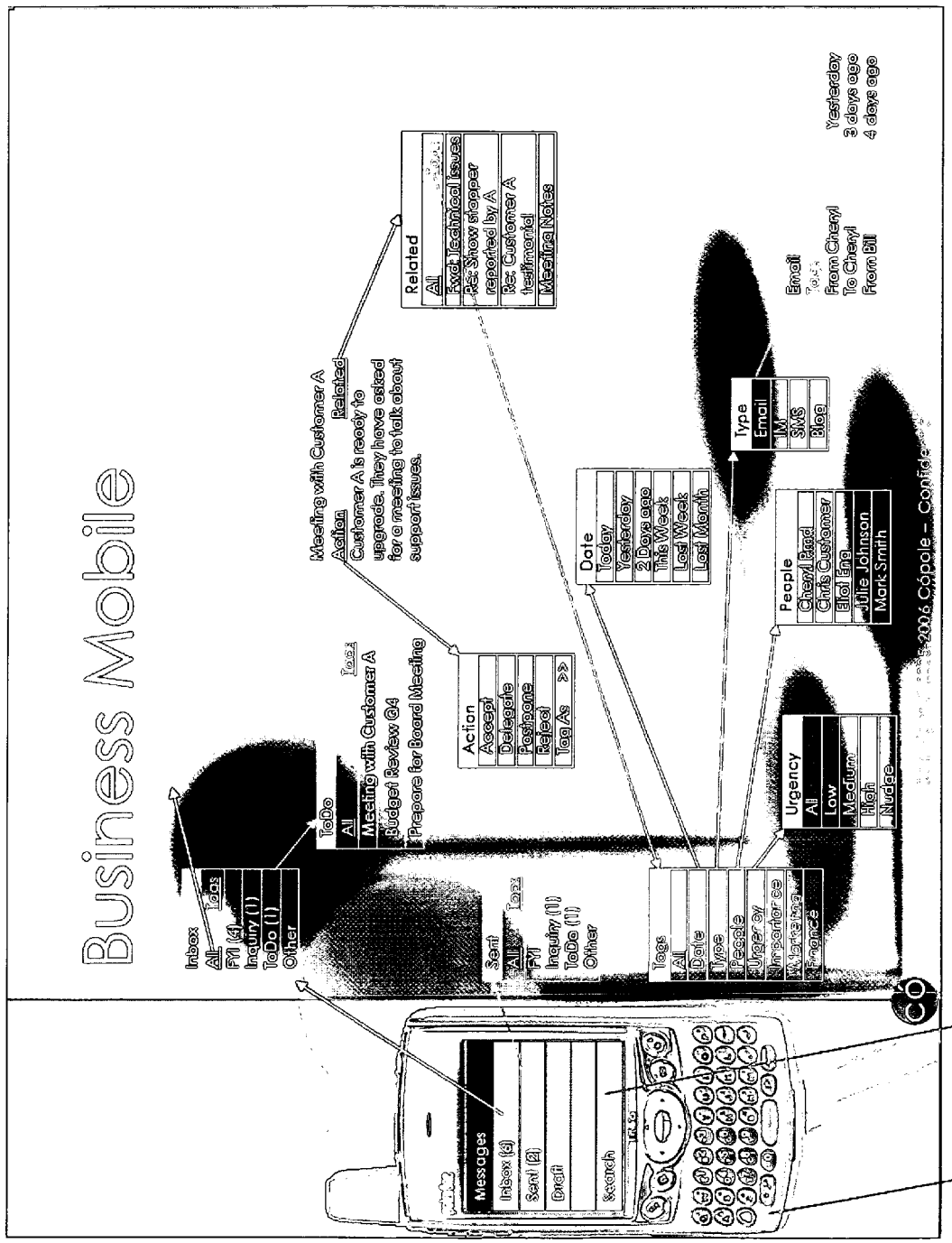
FIG. 14 is a simplified schematic of a PDA having a user interface that includes information for communications (e.g., e-mails) having system classifications according to another embodiment of the present invention.

FIG. 14 is a simplified schematic of a PDA 1400 having a UI 1405 that includes information for communications (e.g., e-mails) having system classifications. PDA 1400 might be configured to run an e-mail application or the like that is configured to operate as described above, for example, to categorize e-mail, make decisions, and send e-mails based on the task, the inquiry, the FYI system classification, a user defined system classification, a user defined classification, such as a tag or the like (described above in detail).

Figure 15:
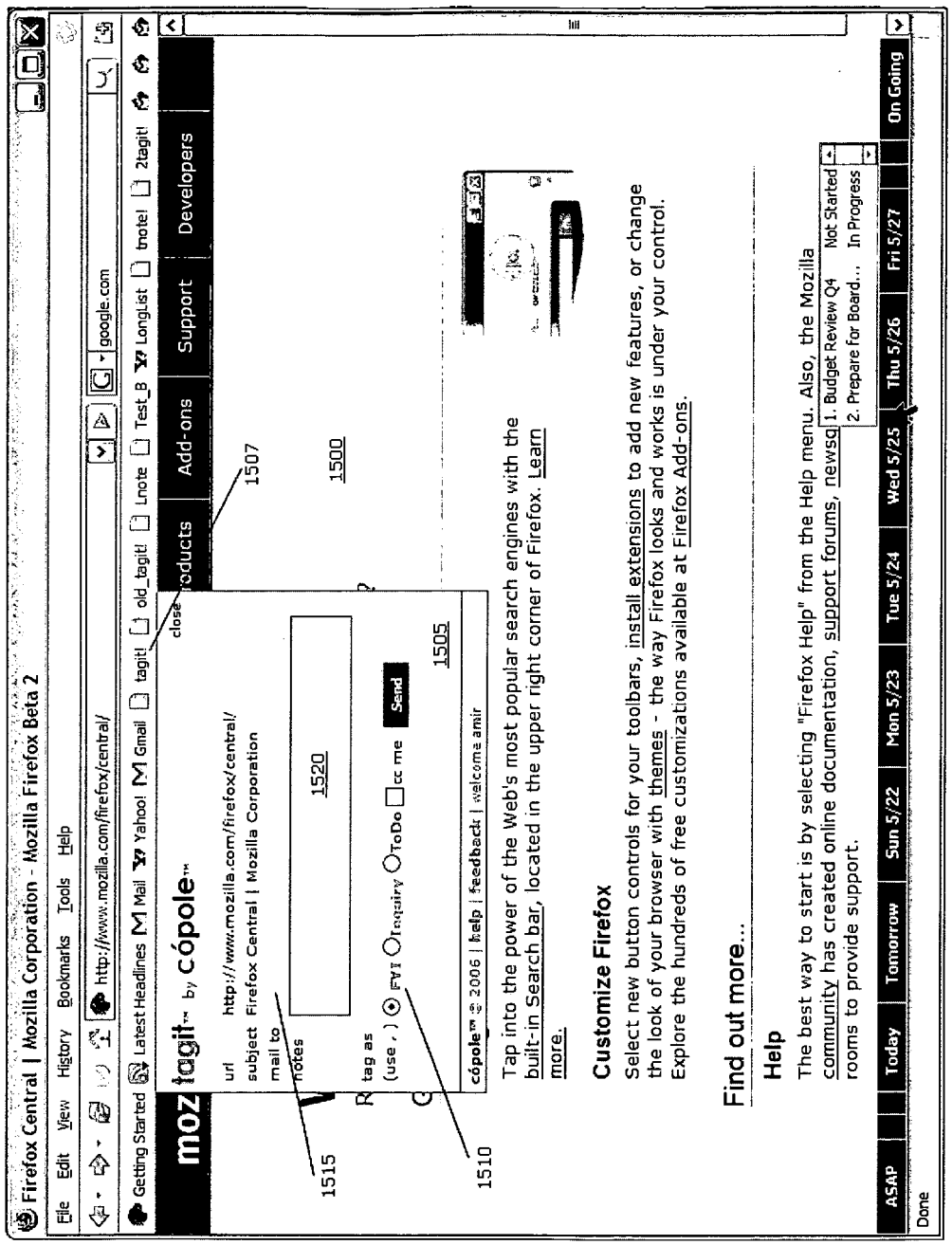
FIG. 15 is a simplified schematic of a user interface that might be configured to launch a communication interface according to one embodiment of the present invention.

FIG. 15 is a simplified schematic of a UI 1500 that might be configured to launch a communication interface 1505 according to one embodiment of the present invention. Communication interface 1505 might be launched from UI 1500 via a screen button 1507 or the like. Communication interface 1505 is associated with an application that might be a native application (e.g., e-mail application) configured to run on a user system, a web based application (e.g., web hosted e-mail application) or the like. The application for communication interface 1505 might be configured to run on set of stand alone servers, and/or may be configured to run on the set of stand alone servers and the client system in combination. The set of stand alone servers may be configured to download a portion of the application that is to be stored on and run by the client system.

A stand alone server may be a server that is independent of a set of servers that is configured to serve the web page underlying the communication interface. The stand alone servers might be associated with an organization that is independent of another organization associated with servers configured to serve the underlying web page.

Screen button 1507 may be associated with a link (such as a URL) that if launched requests the application for the communication interface to place the communication interface on the underlying web page of UI 1500. The link associated with screen button 1507 may be a URL, a URL for a script call (such as a java script call), an API call, or call to launch a native function. The link may be configured to fetch information (e.g., in HTML format) to place the communication interface on the underlying web page.

Screen button 1507 might be a "favorite" button that a user can add to the user's favorites menu, a favorites tool bar or the like. It will be understood by those of skill in the art that the application for communication interface 1505 and for the functionality supporting the interface and its associated functions might also be launched by a set of key strokes or nearly other known, or then used method of launching an application. Applications as referred to herein may include an application that is substantially self contained, or a sub-application that might be added to a self contained application.

According to one embodiment, communication interface 1505 is configured to accept a user input to send a communication (e.g., an e-mail) that includes a link, a copy, or other identifier for underlying web page of UI 1500. The communication interface 1505 further includes a set of screen tools 1510 (e.g., screen buttons, check boxes or the like) that is configured to accept a user input to assign one or more system classification to the communication. The set of screen tools might include check boxes for an FYI, an inquiry, and a ToDo (or task) system classification. Communication interface 1505 may further include a field box 1515 in which an address for a recipient of the communication may be entered. The communication interface may further include a field box 1520 that is configured to accept one or more character strings (e.g., text) that may be sent with the communication. According to one embodiment, the system classification might be associated with the underlying web page. For example, a user of the underlying web page might request that a communication with a link to the web page be sent to a recipient, and request that a task (i.e., system classification) to review the web page be sent with the communication. The message server may be configured to handle the delivery, categorization, etc. of communication as described above in detail.

The method described above for launching communication interface 1505, might also be used for launching other applications, sub-applications or the like. For example, a screen button or the like that is associated with a link may be configured to launch task bar 950, a calendar application (not shown), or other application have that might be placed on UI 1500.

Figure 16:
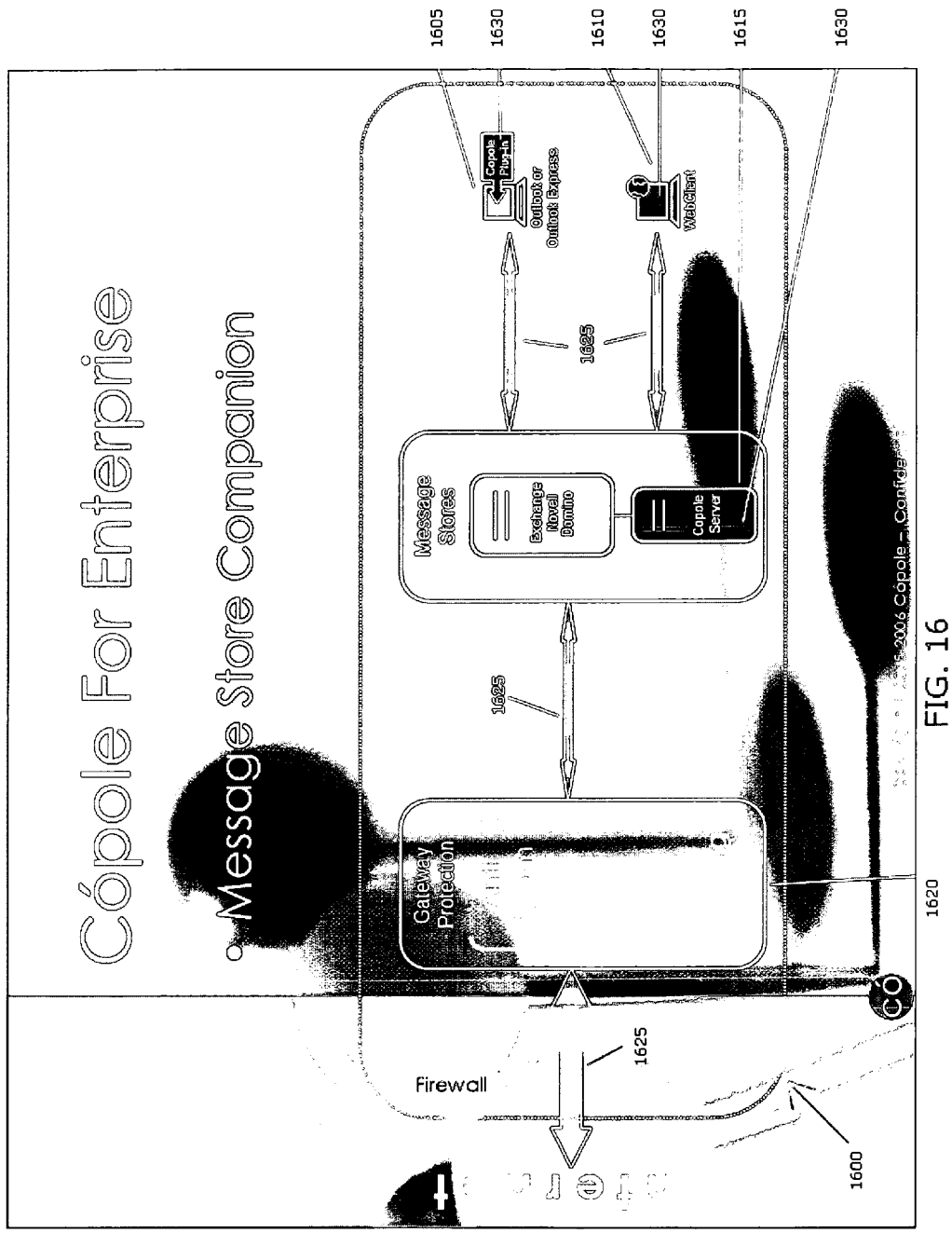
FIG. 16 is a simplified schematic of a communication system according to one embodiment of the present invention.

FIG. 16 is a simplified schematic of a communication system 1600 according to a specific embodiment of the present invention. Communication system 1600 includes a set of client systems 1605, a web client 1610, a message server 1615, a protection gateway 1620, and a network (e.g., the Internet, an intranet or the like) 1625. The message server may include the Microsoft Exchange™ server, the Domino™ Server of IBM, the Novell server, a proprietary server or the like.

The message server might also include a system classification and handling application 1630. System classification and handling application 1630 might be configured to run on a stand alone server or on the message server 1615. The system classification and handling application may be configured to provide the functionality described herein for e-mail having classifications (e.g., system classification, user defined system classifications, user defined classification, etc.) associated therewith.

If system classification and handling application 1630 is configured to run on a stand alone server, the server might include a storage that is configured to accumulate metadata (system classifications, user defined system classifications, tags, etc. described above in detail) for communications (e.g., e-mails, IMs, text messages, and the like discussed above in detail). If system classification and handling application 1630 is configured as a software plug-in for the message server, application 1630 might be configured to use the storage of the message server to accumulate the metadata for the communications.

According to one embodiment, a copy of system classification and handling application 1630 is also configured to run and one or more of the client systems 1605 and/or on web client 1610. The system classification and handling application 1630 may be configured to run as a plug-in application for a communication application, such as an e-mail application, such as Outlook™, Thunderbird™, or the like. The system classification and handling application 1630 might be configured as a stand alone application, such as an e-mail application that is configured to support system classification, user defined system classifications, tagging and the like, which are described above in detail. According to one embodiment of the present invention, each client system might be a person computer, a laptop computer, a palm-top computer, a potable device (e.g., a personal digital assistant, a mobile telephone, or other WAP enabled device). One or both of the client systems and the web client (via system classification and handling application 1630) may be configured to generate and/or receive communications (e.g., e-mail, IM, text messages, etc.) that include system classifications, user defined system classification, tags, and the like. Various UI for the client systems and the web client are described above in detail such that one of skill in the art can make and use the various embodiments of system classification and handling application.

Figure 17:
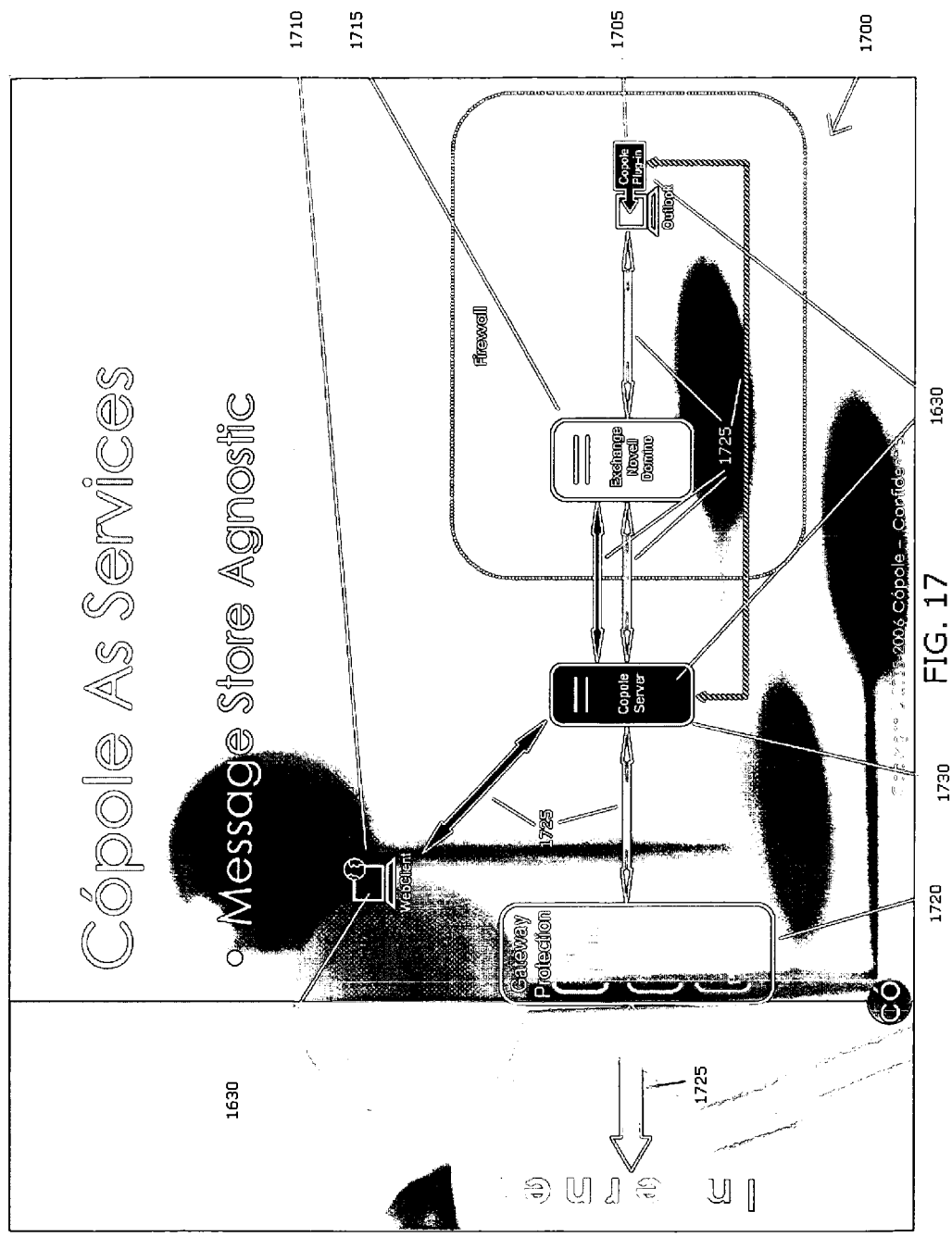
FIG. 17 is a simplified schematic of a communication system according to another embodiment of the present invention.

FIG. 17 is a simplified schematic of a communication system 1700 according to another specific embodiment of the present invention. Communication system 1700 includes a set of user systems 1705, a web client 1710, a message server 1715, a protection gateway 1720, and a network (e.g., the Internet, an intranet or the like) 1725. The message server may include the Microsoft Exchange™ server, the Domino™ Server of IBM, the Novell server, a proprietary server or the like. System classification and handling application 1630 might be configured to run on a stand alone server 1730 that sits between the message server and the protection gateway.

If system classification and handling application 1630 is configured to run on stand alone server 1730, the server might include a storage that is configured to accumulate metadata (system classifications, user defined system classifications, tags, etc. described above in detail) for communications (e.g., e-mails, IMs, text messages, and the like discussed above in detail). This copy of system classification and handling application 1630 might be configured to communicate directly with stand alone server 1730, if for example message server 1715 does not permit the metadata associated with the communication to pass through the message server. Further, if the client systems are associated with a single organization, communications sent from one client system to another client system will not reach the stand alone server. Therefore, the transfer of communications and/or the metadata for the communication may be accumulated and processed by the system classification and handling application running on the stand alone server. The system classification and handling application, via that stand alone server, may forward the communications and/or the metadata for the communications to a client system that is an intended recipient of the communication.

Figure 18:
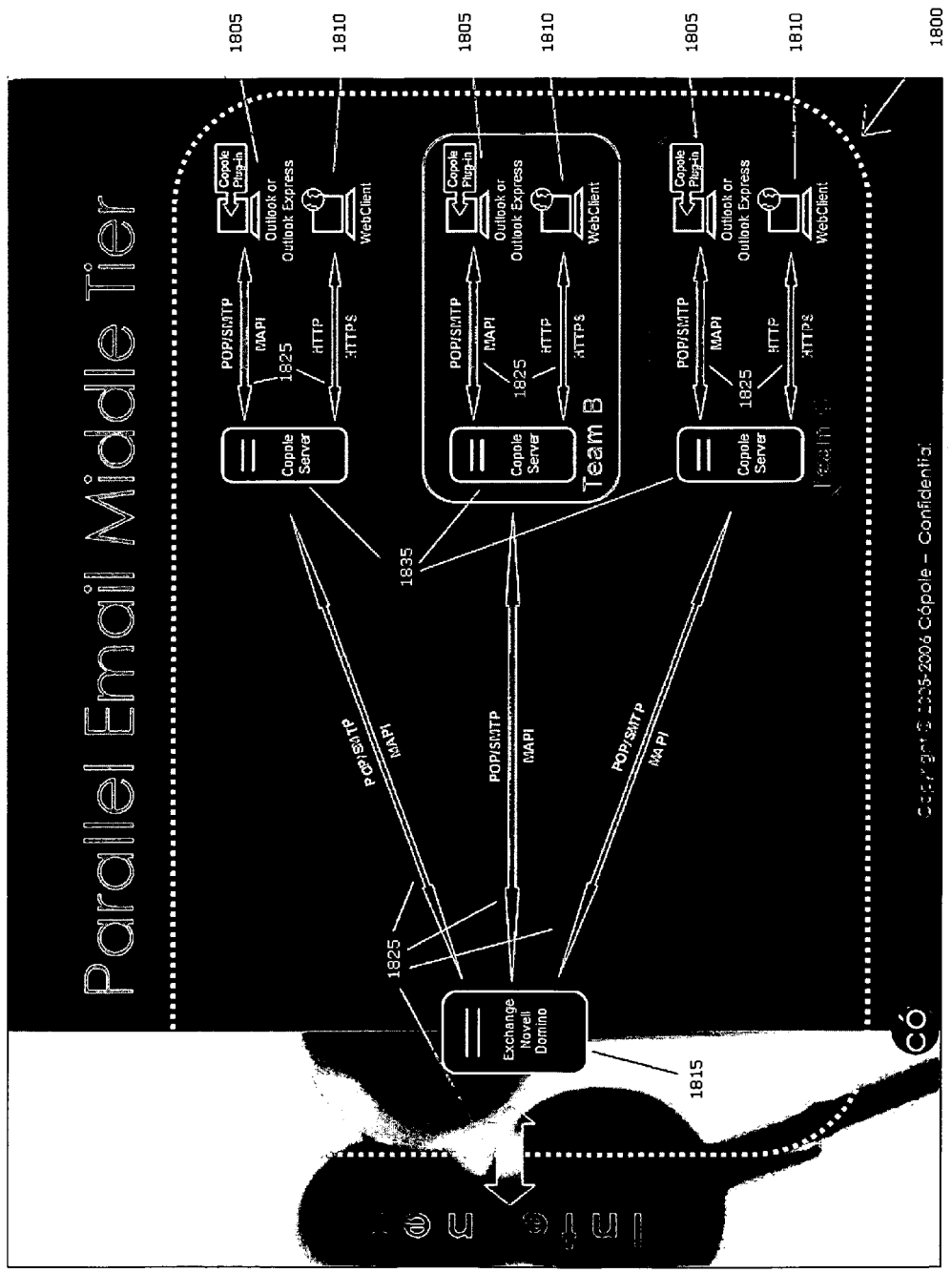
FIG. 18 is a simplified schematic of a communication system according to another embodiment of the present invention.

FIG. 18 is a simplified schematic of a communication system 1800 according to a specific embodiment of the present invention. Communication system 1800 includes a set of user systems 1805, a set of web clients 1810, a message server 1815, a protection gateway (not shown), and a network (e.g., the Internet, an intranet or the like) 1825, and a set of stand alone servers 1835. The message server may include the Microsoft Exchange™ server, the Domino™ Server of IBM, the Novell server, a proprietary server or the like. A copy of the system classification and handling application might be configured to run on each of the stand alone servers 1835 that sits between the client systems, and the message server, and sits between the web clients and message server. The stand alone servers may each include a storage that is configured to accumulate metadata (system classifications, user defined system classifications, tags, etc. described above in detail) for communications (e.g., e-mails, IMs, text messages, and the like discussed above in detail).

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A communication system comprising:
   a. a client processor configured to provide a client application comprising:
      i. a software generating module configured to provide an interface to generate a communication life cycle by composing an email and assigning to the email one or more pieces of classification data from a plurality of pieces of classification data, wherein a first piece of classification data indicates an inquiry, a second piece of classification data indicates a task, and a third piece of classification data indicates an FYI, and wherein the interface comprises one or more interface elements to assign the one or more pieces of classification data to the email, and wherein the one or more pieces of classification data are stored in metadata of the email;
      ii. a software receiving module configured to receive the email, identify an email type based on the metadata of the email, and organize the email according to the email type, the email type comprising an inquiry, a task, or an FYI; and
      iii. a software responding module configured to provide an interface to respond to the email, wherein a response to a task email comprises one or more of: accepting the task, declining the task, indicating an amount completion of the task, and delegating the task to another recipient, and wherein a response to an inquiry email comprises one or more of responding to the inquiry, forwarding the inquiry to another recipient, and deleting the inquiry email, and wherein a response to an FYI email requires generation of another communication life cycle; and
   b. a server comprising a store and a server processor configured to provide a server application comprising:
      iv. a software parsing module configured to parse and store the metadata of the email, wherein the stored metadata comprises classification data and one or more of: identification information of a user sending the email, identification information of a user receiving the email, a task due date, a task completion date, a dependency between more than one task, a dependency between more than one inquiry, and a dependency between more than one user.

2. The communication system of claim 1, wherein the classification data further includes a user defined classification.

3. The communication system of claim 1, wherein the software receiving module configured to receive the email is configured to allow or disallow the delivery of the email based on the one or more classification data assigned to the email.

4. The communication system of claim 3, wherein the allowance or disallowance is based on a user hierarchy, an organization preference, or a user preference.

5. The communication system of claim 1, wherein the client processor further comprises a software module configured to generate at least one report based on the classification data stored in email metadata and track a first status of a first inquiry or a first task.

6. The communication system of claim 5, wherein the status may include a due date, start date, completion date, a delegation, dependencies between a plurality of tasks, or a priority for completion of the first task or response to the first inquiry.

7. The communication system of claim 6, wherein the dependencies between a plurality of tasks are hierarchical dependencies based on delegation of the first task or the first inquiry, or based on a delegation of a portion of the first task or the first inquiry.

8. The communication system of claim 5, wherein the report includes the first status of the first task and at least a second status of a second task associated with the first task.

9. The communication system of claim 8, wherein the association between the first task and the second task is a delegation.

10. The communication system of claim 5, wherein the client processor is configured to communicate the report to members of a group associated with the first task or the first inquiry.

11. The communication system of claim 10, wherein the report is configured to provide the members of a group a collaborative overview of the first task or the first inquiry.

12. The communication system of claim 1, wherein the server comprises a software module configured to track and store a status of the inquiry, or the task and generate and send an update to members of a group associated with the inquiry or the task, wherein the update includes the status.

13. The communication system of claim 12, wherein the status includes dependencies, delegation, ownership of the task, or ownership of the inquiry.

14. The communication system of claim 1, wherein the server further comprises a software module configured to utilize the stored metadata to organize classification data and generate a report comprising one or more of, a delegation chart, a list, a Gantt chart, a timeline chart, and a calendar.

15. The communication system of claim 1, where classification data is used by the server for collaboration and tracking purposes.

16. The communication system of claim 1, wherein an email classified as a task or an inquiry includes a time limit by which to complete the task or respond to the inquiry, respectively.

17. The communication system of claim 1, wherein the email header and body are stored with the metadata.

* * * * *